(12) United States Patent
McAlister et al.

(10) Patent No.: US 9,778,876 B1
(45) Date of Patent: Oct. 3, 2017

(54) LOAD BALANCED ACCESS TO DISTRIBUTED STORAGE OF DATA CUBES

(71) Applicant: SAS Institute Inc., Cary, NC (US)

(72) Inventors: Donald Kent McAlister, Apex, NC (US); Daniel Jacob Underwood, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/475,686

(22) Filed: Mar. 31, 2017

Related U.S. Application Data

(60) Provisional application No. 62/316,669, filed on Apr. 1, 2016.

(51) Int. Cl.
*G06F 3/06* (2006.01)

(52) U.S. Cl.
CPC .......... *G06F 3/0644* (2013.01); *G06F 3/0604* (2013.01); *G06F 3/065* (2013.01); *G06F 3/0653* (2013.01); *G06F 3/0685* (2013.01)

(58) Field of Classification Search
None
See application file for complete search history.

(56) References Cited

U.S. PATENT DOCUMENTS 8,805,998 B2   8/2014 Pereira

OTHER PUBLICATIONS

"The OPTNET Procedure", Linear Assignment (Matching)::SAS/OR(R), 14.1 User's Guide: Network Optimization Algorithms, retrieved from <http://support.sas.com/documentation/cdl/en/ornoaug/68159/HTML/default/viewer.htm#ornoaug_optnet_details22.htm>, Mar. 21, 2016, 1 pages, (author unknown).

*Primary Examiner* — Kevin Verbrugge

(57) ABSTRACT

An apparatus includes a processor and a storage storing instructions causing the processor to compare quantities of node devices storing partitions and of the partitions to determine whether the node device quantity is less than the partition quantity. In response to the node device quantity of node being less: for each stored copy of each partition, assign a cost to load the copy of the partition based at least on a size of the partition; add dummy node devices to cause the node device quantity to at least equal the partition quantity; for each dummy node device, assign a very high cost to load each partition; use MILP to derive a first pass assignment of a single copy of each partition to be loaded within either a node device or dummy node device; and transmit an indication of at least the first pass assignment to the node devices.

30 Claims, 27 Drawing Sheets

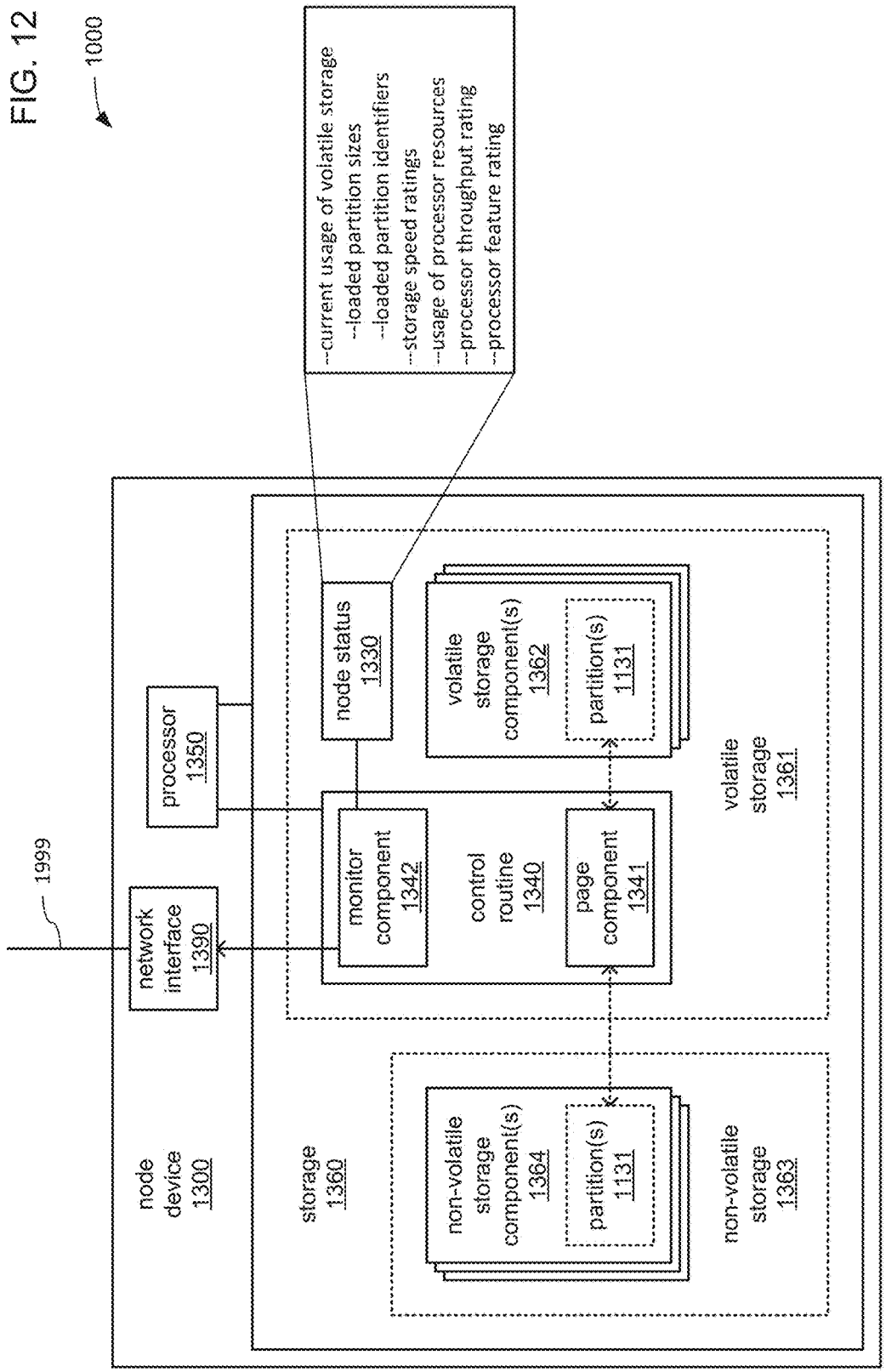

LOAD BALANCED ACCESS TO DISTRIBUTED STORAGE OF DATA CUBES

CROSS-REFERENCE TO RELATED APPLICATIONS

This application claims the benefit of priority under 35 U.S.C. §119(e) to U.S. Provisional Application Ser. No. 62/316,669 filed Apr. 1, 2016, the entirety of which is incorporated herein by reference.

BACKGROUND

It has become increasingly commonplace to use grids of multiple node devices to perform widely varied analyses of large data sets (e.g., what is commonly referred to as "big data") of widely varied types. Such grids of node devices are often used to speed the performance of an analysis of a large data set by independently processing multiple partitions of the data set in parallel through the parallel execution of identical and/or otherwise related analysis routines.

In performing such storage, it has become commonplace to divide a data set (e.g., a data cube or data "hypercube") into partitions that are distributed among multiple node devices for storage. Such distributed storage enables distributed access to and/or use of such data in analyses that may be performed at least partially in parallel among the node devices that each store at least one of the partitions.

It has also become commonplace to additionally generate and store, in a similarly distributed manner, one or more copies of each partition among the multiple node devices. Such distributed storage of additional copies can provide a degree of fault tolerance against losing any partition of a large data set if one or more of the node devices experiences a failure, and may enable a choice to be made as to which of more than one node devices is to be used to access and/or perform an analyses with each of the partitions.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations including receive node status from a plurality of node devices of a node device grid, wherein the node status comprises an indication of status of storage of each node device of the plurality of node devices. The processor may be further caused to receive a request to perform an operation with a first data cube, wherein the first data cube comprises a plurality of partitions, and at least one copy of the partitions of the first data cube are distributed among the plurality of node devices such that non-volatile storage of each node device stores a copy of at least one partition of the first data cube. The processor may be further caused to compare quantities of the node devices of the plurality of node devices and of the partitions of the first data cube to determine whether the quantity of node devices of the plurality of node devices is less than the quantity of partitions of the first data cube. The processor may be further caused to, in response to a determination that the quantity of node devices of the plurality of node devices is less than the quantity of partitions of the first data cube: for each copy of each partition of the first data cube stored within the non-volatile storage of a node device of the plurality of node devices, assign a cost to load the copy of the partition from the non-volatile storage of the node device based at least on a size of the partition; add, to the quantity of node devices of the plurality of node devices, a first quantity of dummy node devices to cause a sum of the quantity of node devices of the plurality of node devices and the first quantity of dummy node devices to at least equal the quantity of partitions of the first data cube; for each dummy node device of the first quantity of dummy node devices, assign a cost to load each partition of the first data cube from a non-volatile storage of the dummy node device that is greater than any of the costs to load any partition of the first data cube stored in the non-volatile storage of any of the node devices of the plurality of node devices; using mixed integer linear programming (MILP), derive a first pass of assignment of a single copy of each partition of the first data cube to be loaded from the non-volatile storage of either a node device of the plurality of node devices or a dummy node device of the first quantity of dummy node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

In response to a determination that the quantity of node devices of the plurality of node devices is less than the quantity of partitions of the first data cube, the processor may be caused to perform operations comprising: for each copy of a partition of the first data cube assigned to be loaded from the non-volatile storage of a dummy node device of the first quantity of dummy node devices, use MILP to derive a second pass of assignment of the copy of the partition of the first data cube to be loaded from the non-volatile storage of a node device of the plurality of node devices; augment at least one task routine with an indication as the assignment of a single copy of a partition of the first data cube to be loaded from the non-volatile storage of, and into the volatile storage of, a node device of the plurality of node devices based on the second pass of assignment; analyze the distribution of the partitions of the first data cube among the plurality of node devices to determine whether there is at least a one-to-one distribution of at least one copy of the partitions of the first data cube among the plurality of node devices; and condition the transmission of the task routines to the plurality of node devices on a determination that there is not at least a one-to-one distribution of at least one copy of the partitions of the first data cube among the plurality of node devices.

The processor, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, may be caused to perform operations comprising: for each copy of each partition of the first data cube stored within the non-volatile storage of a node device of the plurality of node devices, assign a single identical cost to load the copy of the partition from the non-volatile storage of the node device; derive, as a linear assignment problem, the first pass of assignment of a single copy of each partition of the first data cube to be loaded from the non-volatile storage of a node device of the plurality of node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

The requested operation may be performed with a second data cube in addition to the first data cube, the second data cube may include a plurality of partitions, and the partitions of the second data cube may be distributed among the plurality of node devices such that non-volatile storage of each node device stores a copy of at least one partition of the second data cube. The processor may be caused to perform operations including compare quantities of the node devices of the plurality of node devices and of the partitions of the second data cube to determine whether the quantity of node devices of the plurality of node devices is less than the quantity of partitions of the second data cube, and analyze the distribution of the partitions of the second data cube among the plurality of node devices to determine whether there is at least a one-to-one distribution of at least one copy of the partitions of the second data cube among the plurality of node devices.

The processor, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, may be caused to perform operations including: for each copy of each partition of the second data cube stored within the non-volatile storage of a node device of the plurality of node devices, assign a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device; add, to the quantity of node devices of the plurality of node devices, a second quantity of dummy node devices to cause a sum of the quantity of node devices of the plurality of node devices and the second quantity of dummy node devices to at least equal the quantity of partitions of the second data cube; for each dummy node device of the second quantity of dummy node devices, assign a cost to load each partition of the second data cube from a non-volatile storage of the dummy node device that is greater than any of the costs to load any partition of the second data cube stored in the non-volatile storage of any of the node devices of the plurality of node devices; use MILP to derive a third pass of assignment of a single copy of each partition of the second data cube to be loaded from the non-volatile storage of either a node device of the plurality of node devices or a dummy node device of the second quantity of dummy node devices; for each copy of a partition of the second data cube assigned to be loaded from the non-volatile storage of a dummy node device of the second quantity of dummy node devices, use MILP to derive a fourth pass of assignment of the copy of the partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on a combination of the third and fourth passes of assignment.

The processor, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, may be caused to perform operations including: for each copy of each partition of the second data cube stored within the non-volatile storage of a node device of the plurality of node devices, assign a cost to read the copy of the partition of the second data cube from the non-volatile storage of the node device based at least on a characteristic of any partition of the first data cube assigned in the first pass to be loaded from the non-volatile storage of the node device; use MILP to derive a third pass of assignment of a single copy of each partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on the third pass of assignment.

The apparatus may include a node device of the plurality of node devices; and the processor may be caused to execute a task routine, at least partially in parallel with the execution of one of the task routines by a processor of another node device of the plurality of node devices, to perform the requested operation at least partially in parallel with the processor of the other node device.

The processor may be caused to transmit instructions to the plurality of node devices to receive the plurality of partitions of the first data cube from at least one storage device for storage within the non-volatile storages of the plurality of node devices.

The status of storage of each node device of the plurality of node devices may be selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device; and the size of each partition of the first data cube may be selected from a group consisting of the quantity of storage space currently occupied by the partition, and a quantity of entries of the partition.

The operation may be selected from a group consisting of a join of the first data cube with one or more other data cubes, a retrieval of the first data cube to transmit at least a subset of the first data cube to another device, and an analysis of at least a subset of the first data cube.

A computer-program product tangibly embodied in a non-transitory machine-readable storage medium, the computer-program product including instructions operable to cause a processor to perform operations including receive node status from a plurality of node devices of a node device grid, wherein the node status comprises an indication of status of storage of each node device of the plurality of node devices. The processor may be further caused to receive a request to perform an operation with a first data cube, wherein the first data cube comprises a plurality of partitions, and at least one copy of the partitions of the first data cube are distributed among the plurality of node devices such that non-volatile storage of each node device stores a copy of at least one partition of the first data cube. The processor may be further caused to compare quantities of the node devices of the plurality of node devices and of the partitions of the first data cube to determine whether the quantity of node devices of the plurality of node devices is less than the quantity of partitions of the first data cube. The processor may be further caused to, in response to a determination that the quantity of node devices of the plurality of node devices is less than the quantity of partitions of the first data cube: for each copy of each partition of the first data cube stored within the non-volatile storage of a node device of the plurality of node devices, assign a cost to load the copy of the partition from the non-volatile storage of the node device based at least on a size of the partition; add, to the quantity of node devices of the plurality of node devices, a first quantity of dummy node devices to cause a sum of the quantity of node devices of the plurality of node devices and the first quantity of dummy node devices to at least equal the quantity of partitions of the first data cube; for each dummy node device of the first quantity of dummy node devices, assign a cost to load each partition of the first data cube from a non-volatile storage of the dummy node device that is greater than any of the costs to load any partition of the first data cube stored in the non-volatile storage of any of the node devices of the plurality of node devices; using mixed integer linear programming (MILP), derive a first pass of assignment of a single copy of each partition of the first data cube to be loaded from the non-volatile storage of either a node device of the plurality of node devices or a dummy node device of the first quantity of dummy node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

In response to a determination that the quantity of node devices of the plurality of node devices is less than the quantity of partitions of the first data cube, the processor may be caused to perform operations including: for each copy of a partition of the first data cube assigned to be loaded from the non-volatile storage of a dummy node device of the first quantity of dummy node devices, use MILP to derive a second pass of assignment of the copy of the partition of the first data cube to be loaded from the non-volatile storage of a node device of the plurality of node devices; augment at least one task routine with an indication as the assignment of a single copy of a partition of the first data cube to be loaded from the non-volatile storage of, and into the volatile storage of, a node device of the plurality of node devices based on the second pass of assignment; analyze the distribution of the partitions of the first data cube among the plurality of node devices to determine whether there is at least a one-to-one distribution of at least one copy of the partitions of the first data cube among the plurality of node devices; and condition the transmission of the task routines to the plurality of node devices on a determination that there is not at least a one-to-one distribution of at least one copy of the partitions of the first data cube among the plurality of node devices.

The processor, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, may be caused to perform operations including: for each copy of each partition of the first data cube stored within the non-volatile storage of a node device of the plurality of node devices, assign a single identical cost to load the copy of the partition from the non-volatile storage of the node device; derive, as a linear assignment problem, the first pass of assignment of a single copy of each partition of the first data cube to be loaded from the non-volatile storage of a node device of the plurality of node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

The requested operation may be performed with a second data cube in addition to the first data cube, the second data cube may include a plurality of partitions, and the partitions of the second data cube may be distributed among the plurality of node devices such that non-volatile storage of each node device stores a copy of at least one partition of the second data cube. The processor may be caused to perform operations including compare quantities of the node devices of the plurality of node devices and of the partitions of the second data cube to determine whether the quantity of node devices of the plurality of node devices is less than the quantity of partitions of the second data cube, and analyze the distribution of the partitions of the second data cube among the plurality of node devices to determine whether there is at least a one-to-one distribution of at least one copy of the partitions of the second data cube among the plurality of node devices.

The processor, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, may be caused to perform operations comprising: for each copy of each partition of the second data cube stored within the non-volatile storage of a node device of the plurality of node devices, assign a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device; add, to the quantity of node devices of the plurality of node devices, a second quantity of dummy node devices to cause a sum of the quantity of node devices of the plurality of node devices and the second quantity of dummy node devices to at least equal the quantity of partitions of the second data cube; for each dummy node device of the second quantity of dummy node devices, assign a cost to load each partition of the second data cube from a non-volatile storage of the dummy node device that is greater than any of the costs to load any partition of the second data cube stored in the non-volatile storage of any of the node devices of the plurality of node devices; use MILP to derive a third pass of assignment of a single copy of each partition of the second data cube to be loaded from the non-volatile storage of either a node device of the plurality of node devices or a dummy node device of the second quantity of dummy node devices; for each copy of a partition of the second data cube assigned to be loaded from the non-volatile storage of a dummy node device of the second quantity of dummy node devices, use MILP to derive a fourth pass of assignment of the copy of the partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on a combination of the third and fourth passes of assignment.

The processor, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, may be caused to perform operations including: for each copy of each partition of the second data cube stored within the non-volatile storage of a node device of the plurality of node devices, assign a cost to read the copy of the partition of the second data cube from the non-volatile storage of the node device based at least on a characteristic of any partition of the first data cube assigned in the first pass to be loaded from the non-volatile storage of the node device; use MILP to derive a third pass of assignment of a single copy of each partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on the third pass of assignment.

The processor may be caused to perform operations including: receive, from the plurality of node devices, results of the performances of the requested operation by the processors of the node devices; generate results data indicative of a combination of the results of the performances of the requested operation; and transmit the results data to another device.

The processor may be caused to transmit instructions to the plurality of node devices to receive the plurality of partitions of the first data cube from at least one storage device for storage within the non-volatile storages of the plurality of node devices.

The status of storage of each node device of the plurality of node devices may be selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device. The size of each copy of each partition of the first data cube may be selected from a group consisting of the quantity of storage space currently occupied by the partition, and a quantity of entries of the partition.

The operation may be selected from a group consisting of a join of the first data cube with one or more other data cubes, a retrieval of the first data cube to transmit at least a subset of the first data cube to another device, and an analysis of at least a subset of the first data cube.

A computer-implemented method may include receiving, at a coordinating device of a node device grid, node status from a plurality of node devices of the node device grid, wherein the node status comprises an indication of status of storage of each node device of the plurality of node devices. The method may further include receiving, at the coordinating device, a request to perform an operation with a first data cube, wherein the first data cube may include a plurality of partitions, and at least one copy of the partitions of the first data cube are distributed among the plurality of node devices such that non-volatile storage of each node device stores a copy of at least one partition of the first data cube. The method may further include comparing, at the coordinating device, quantities of the node devices of the plurality of node devices and of the partitions of the first data cube to determine whether the quantity of node devices of the plurality of node devices is less than the quantity of partitions of the first data cube. The method may further include, in response to a determination that the quantity of node devices of the plurality of node devices is less than the quantity of partitions of the first data cube, performing operations at the coordinating device including: for each copy of each partition of the first data cube stored within the non-volatile storage of a node device of the plurality of node devices, assigning a cost to load the copy of the partition from the non-volatile storage of the node device based at least on a size of the partition; adding, to the quantity of node devices of the plurality of node devices, a first quantity of dummy node devices to cause a sum of the quantity of node devices of the plurality of node devices and the first quantity of dummy node devices to at least equal the quantity of partitions of the first data cube; for each dummy node device of the first quantity of dummy node devices, assigning a cost to load each partition of the first data cube from a non-volatile storage of the dummy node device that is greater than any of the costs to load any partition of the first data cube stored in the non-volatile storage of any of the node devices of the plurality of node devices; using mixed integer linear programming (MILP), deriving a first pass of assignment of a single copy of each partition of the first data cube to be loaded from the non-volatile storage of either a node device of the plurality of node devices or a dummy node device of the first quantity of dummy node devices; and transmitting, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

The method may further include, in response to a determination that the quantity of node devices of the plurality of node devices is less than the quantity of partitions of the first data cube, performing operations at the coordinating device comprising: for each copy of a partition of the first data cube assigned to be loaded from the non-volatile storage of a dummy node device of the first quantity of dummy node devices, using MILP to derive a second pass of assignment of the copy of the partition of the first data cube to be loaded from the non-volatile storage of a node device of the plurality of node devices; augmenting at least one task routine with an indication as the assignment of a single copy of a partition of the first data cube to be loaded from the non-volatile storage of, and into the volatile storage of, a node device of the plurality of node devices based on the second pass of assignment; analyzing the distribution of the partitions of the first data cube among the plurality of node devices to determine whether there is at least a one-to-one distribution of at least one copy of the partitions of the first data cube among the plurality of node devices; and conditioning the transmission of the task routines to the plurality of node devices on a determination that there is not at least a one-to-one distribution of at least one copy of the partitions of the first data cube among the plurality of node devices.

The method may further include, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, performing operations at the coordinating device including: for each copy of each partition of the first data cube stored within the non-volatile storage of a node device of the plurality of node devices, assigning a single identical cost to load the copy of the partition from the non-volatile storage of the node device; deriving, as a linear assignment problem, the first pass of assignment of a single copy of each partition of the first data cube to be loaded from the non-volatile storage of a node device of the plurality of node devices; and transmitting, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

The requested operation may be performed with a second data cube in addition to the first data cube, the second data cube may include a plurality of partitions, and the partitions of the second data cube may be distributed among the plurality of node devices such that non-volatile storage of each node device stores a copy of at least one partition of the second data cube. The method may further include: comparing, at the coordinating device, quantities of the node devices of the plurality of node devices and of the partitions of the second data cube to determine whether the quantity of node devices of the plurality of node devices is less than the quantity of partitions of the second data cube; and analyzing, at the coordinating device, the distribution of the partitions of the second data cube among the plurality of node devices to determine whether there is at least a one-to-one distribution of at least one copy of the partitions of the second data cube among the plurality of node devices.

The method may further include, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, performing operations at the coordinating device including: for each copy of each partition of the second data cube stored within the non-volatile storage of a node device of the plurality of node devices, assigning a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device; adding, to the quantity of node devices of the plurality of node devices, a second quantity of dummy node devices to cause a sum of the quantity of node devices of the plurality of node devices and the second quantity of dummy node devices to at least equal the quantity of partitions of the second data cube; for each dummy node device of the second quantity of dummy node devices, assigning a cost to load each partition of the second data cube from a non-volatile storage of the dummy node device that is greater than any of the costs to load any partition of the second data cube stored in the non-volatile storage of any of the node devices of the plurality of node devices; using MILP to derive a third pass of assignment of a single copy of each partition of the second data cube to be loaded from the non-volatile storage of either a node device of the plurality of node devices or a dummy node device of the second quantity of dummy node devices; for each copy of a partition of the second data cube assigned to be loaded from the non-volatile storage of a dummy node device of the second quantity of dummy node devices, using MILP to derive a fourth pass of assignment of the copy of the partition of the second data cube to be loaded from the non-volatile storage of a node device of the plurality of node devices; and augmenting each task routine with an indication of the assignment of a single copy of each partition of the second data cube to be loaded from the non-volatile storage of, and into the volatile storage of, a node device of the plurality of node devices based on a combination of the third and fourth passes of assignment.

The method may further include, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, performing operations at the coordinating device including: for each copy of each partition of the second data cube stored within the non-volatile storage of a node device of the plurality of node devices, assigning a cost to read the copy of the partition of the second data cube from the non-volatile storage of the node device based at least on a characteristic of any partition of the first data cube assigned in the first pass to be loaded from the non-volatile storage of the node device; using MILP to derive a third pass of assignment of a single copy of each partition of the second data cube to be loaded from the non-volatile storage of a node device of the plurality of node devices; and augmenting each task routine with an indication of the assignment of a single copy of each partition of the second data cube to be loaded from the non-volatile storage of, and into the volatile storage of, a node device of the plurality of node devices based on the third pass of assignment.

The method may further include receiving, at the coordinating device and from the plurality of node devices, results of the performances of the requested operation by the processors of the node devices; generating, at the coordinating device, results data indicative of a combination of the results of the performances of the requested operation; and transmitting, from the coordinating device, the results data to another device.

The method may further include transmitting instructions to the plurality of node devices to receive the plurality of partitions of the first data cube from at least one storage device for storage within the non-volatile storages of the plurality of node devices.

The status of storage of each node device of the plurality of node devices may be selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device. The size of each copy of each partition of the first data cube may be selected from a group consisting of the quantity of storage space currently occupied by the partition, and a quantity of entries of the partition.

The operation may be selecting from a group consisting of a join of the first data cube with one or more other data cubes, a retrieval of the first data cube to transmit at least a subset of the first data cube to another device, and an analysis of at least a subset of the first data cube.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 12 illustrates an example embodiment of page management within node devices of a distributed processing system.

DETAILED DESCRIPTION

Figure 1:
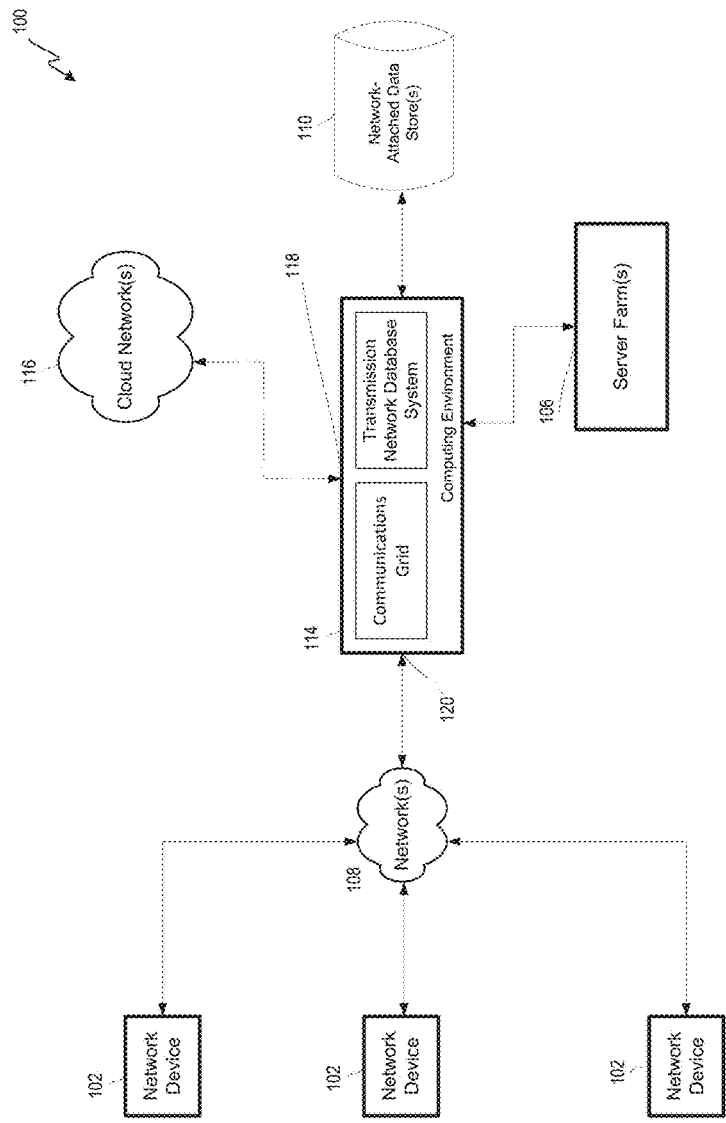
FIG. 1 illustrates a block diagram that provides an illustration of the hardware components of a computing system, according to some embodiments of the present technology.

Various embodiments described herein are generally directed to techniques for deriving a load-balanced assignment for the loading of multiple partitions of a data cube within multiple node devices of a node device grid. More precisely, multiple copies of each partition of multiple partitions of a data cube may be distributed among multiple node devices of a node device grid to be stored within non-volatile storages thereof. Where the partitions of the data cube are to be loaded from the non-volatiles storages and into the volatile storages of at least some of the node devices in preparation for performing any of a variety of operations therewith, the costs associated with such loading of each copy of each partition may be used to determine the node device within which each partition is assigned to be loaded. More specifically, such costs may be used as inputs in the performance of multiple passes of a mixed-integer linear programming (MILP) analysis to arrive at such an assignment for the loading of the partitions that has a lower overall cost than other possible assignments, such that the resources of those node devices may be more efficiently used and the performance of an operation with the partitions may begin more quickly. Additionally, through such use of a MILP analysis, assignments may also be derived in situations in which the partitions of more than one data cube are to be loaded such that the loading of partitions of more than one data cube may be required to take place within one or more node devices.

The data items that make up each data cube may include any of a wide variety of types of data concerning any of a wide variety of subjects. By way of example, such data may include scientific observation data concerning geological and/or meteorological events, or from sensors laboratory experiments in areas such as particle physics. By way of another example, the such data may include indications of activities performed by a random sample of individuals of a population of people in a selected country or municipality, or of a population of a threatened species under study in the wild.

The grid of node devices may provide distributed storage for multiple copies of each of the partitions of one or more data cubes to provide one or both of fault tolerance and/or faster access through the use of parallelism in the reception, storage, retrieval and/or transmission of the partitions via network connections operated at least partially in parallel. The manner in which a data cube is divided into partitions that are stored among the node devices in a distributed manner may depend on numerous factors, including and not limited to, structural features of the manner in which data items are organized within the data cube, and/or dependencies among different data items and/or sets of data items within the data cube. As a result, the partitions of a data cube may be of widely varying sizes and/or employ widely varying data structures by which subsets of the data items of the data cube may be organized within each of the partitions. A coordinating device associated with the node device grid may coordinate the division of data cubes into partitions and/or the provision of multiple copies of each of the partitions thereof to the node devices for storage. In so doing, the coordinating device may generate assignment data indicative of which node device each copy of each partition is stored within.

Each of the node devices may incorporate storage capabilities implemented as a combination of volatile and non-volatile storage. The volatile storage may be implemented with one or more storage components that employ a storage technology that enables relatively speedy access to data and/or routines stored therein, but which is unable to retain data and/or routines stored therein without a continuous supply of electrical power. The non-volatile storage may be implemented with one or more storage components that employ a storage technology that is able to retain data and/or routines stored therein regardless of whether electric power continues to be provided, but which is unable to provide access that is as speedy as that provided by various volatile storage technologies on which the volatile storage may be based.

Due to the speedier access provided by the volatile storage in comparison to the non-volatile storage, instructions in the process of being executed by the processor(s) incorporated into each node device may be stored within volatile storage where they are able to be more speedily read, written and/or modified. However, due to what are often lower costs and/or higher storage densities of the non-volatile storage components in comparison to the volatile storage components, the non-volatile storage may be implemented to have a higher storage capacity than the volatile storage within each of the node devices. Although there may be data cubes that are sufficiently small in size as to be storable entirely within volatile storage, it is envisioned that the partitions of the majority of data cubes are more likely to each be too large to do so.

As a result, and as may be familiar to those skilled in the art, any of a variety of page management algorithms may be employed to select page-sized portions of data and/or routines to be swapped into volatile storage, and/or to select pages to be retained within volatile storage while others are swapped back to non-volatile storage, including and not limited to, any of a variety of demand-based and/or predictive algorithms. In one or more embodiments, one or more of the node devices may execute an operating system (OS) and/or other routine that includes a paging component that performs such swapping of uniformly sized pages of data and/or routines based on which pages contain data and/or routines that a processor of the node device is attempting to access and/or which the processor is likely to access next. Thus, where a particular partition of data stored within non-volatile storage is to be accessed by a processor of one of the node devices, at least the portion of the partition of data that the processor attempts to access may be loaded from the non-volatile storage and into the volatile storage based on such page management.

As may be familiar to those skilled in the art, due to such factors as at least the slower speed of access of the non-volatile storage, there can be said to be a cost in elapsed time to loading the page-sized portions of a data partition from non-volatile storage and into volatile storage. Although the difference in speed of access between non-volatile and volatile storage may be sufficiently great that the portion of the elapsed contributed by accesses made to volatile storage to write a page-sized portion therein may often be seen as negligible, that contribution to the elapsed time is not nothing. As also may be familiar to those skilled in the art, due to such factors as the typically lower quantity of storage space provided by volatile storage, there can be said to be a cost in consumption of storage resources to loading the page-sized portions of a data partition into the volatile storage, since typically, an equal quantity of page-sized portions of other data and/or of one or more routines must be selected to be swapped out of the volatile storage to make storage space available. Such swapping out of page-sized portions of other data and/or one or more routines may impose the future costs associated with re-loading what was swapped out back into volatile storage, again, instead of allowing the other data and/or the one or more routine to remain within the volatile storage for at least some amount of time longer. There may be still other measurable costs, such as an elapsed amount of time required for one or more cache systems of the processor to be preemptively loaded with cache line-sized portions of the partition, after page-sized portions of the partition have been loaded into the volatile storage.

Thus, regardless of the operation to be performed by the processor with a partition of data, there are measurable costs to making the partition available to the processor by loading the partition into volatile storage. Also, depending on differences between node devices, such as differences in availability of storage space in volatile storage due to differences in what other data and/or one or more routines may be also be loaded therein, such measurable costs to load a particular partition into volatile storage may differ from one node to another. Therefore, in making determinations of the best way to make most effective use of the limited resources provided by each node device in a node device grid, it may be advantageous to employ such costs as at least a factor in determining whether to load a particular partition of a data cube from non-volatile storage and into volatiles storage within one node device, or from non-volatile storage and into volatile storage within another node device.

As will be familiar to those tasks with overseeing the operation of such systems as grids of node devices, there is usually significant motivation to keep such systems as fully utilized around the clock to the degree possible as such systems often require a high level of investment in time, money and other resources to build and maintain. By being able to use such measurable costs in determining assignments of partitions to be loaded within various node devices, the processing, storage and/or other resources of each of the node devices within which each such partition could be loaded are more efficiently utilized. This may lead to the faster loading of partitions of data cubes in preparation for performing operations with those data cubes, thereby enabling the performances of those operations to begin more quickly. Thus, the overall amount of time from the commencement of loading of partitions to the completion of the operations performed with those partitions may be reduced, and this may ultimately allow more operations to be performed with the data cubes in less time.

While such measurable costs as are described just above for the loading of a partition may seem quite tiny for each individual act of loading a partition, such tiny costs replicated many thousands of time each hour can become very significant, very quickly. Therefore, by taking such costs into account by using a MILP analysis in assigning the loading of different partitions within different nodes of a grid for each occasion in which the partitions of a data cube are to be accessed, the number of analyses are able to be performed by the grid each hour and each day may be increased. The ability to achieve such an increase the number of analyses able to be performed may be determinative in such decisions as whether the grid must be expanded or replaced, whether upgrading or replacement of at least some of the node devices is required, and/or whether another grid is required.

Therefore, where an operation is to be performed that necessitates the loading of the partitions of a single data cube into the volatile storages of multiple node devices of a node device grid, a coordinating device of the grid may first determine whether the quantity of partitions is greater than the quantity of node devices that are current available to perform the operation that each currently store a copy of at least one of the partitions in non-volatile storage. Such operations may include the retrieval of the entire data cube from non-volatile storage for transmission of the entire data cube to one or more other devices, such as one or more storage devices, or another grid of node devices. In determining which of such node devices are available, the coordinating device may use indications of status that may be recurringly transmitted by each of the node devices.

If the quantity of partitions is not greater than the quantity of such node devices, then there may be a sufficient quantity of such node devices to enable each partition to be loaded within a separate one of the node devices, provided that the distribution of the copies of the partitions among those node devices enables such separate loading. The coordinating device may derive an assignment for the loading of the partitions within those node devices through linear assignment or other techniques in which the costs for loading each of the partitions into volatile storage within different ones of the node devices may not be taken into account. More specifically, a cost value of zero may be ascribed to the loading of each partition within any of the node devices in which a copy of that partition is stored in non-volatile storage, thereby simplifying the analysis to the extent that a linear assignment analysis may be used. Such use of a linear assignment analysis or other techniques that are simpler to implement than a MILP analysis may be deemed desirable to speed the derivation of the assignment under such circumstances.

However, if the quantity of partitions is greater than the quantity of such node devices, then the loading of more than one partition is to necessarily occur within one or more of the node devices, and the coordinating device may employ multiple passes of a MILP analysis to derive an assignment for the loading of the partitions within those node devices. In a first pass of MILP analysis, fictional dummy node devices may be added to the quantity of real node devices that are available, and within which a copy of at least one partition has been stored, to reach a sum of real and dummy node devices that equals the quantity of partitions. Costs associated with the characteristics of the partitions may be ascribed to the loading of each copy of each partition stored within one of the real node devices, while a fictitious and much higher cost may be ascribed to the loading of each partition within each dummy node device. A second pass of MILP analysis may then be performed that includes only the one or more partitions assigned to be loaded within a dummy node in the first pass, and that includes only the real node devices. In the second pass, for each partition assigned to be loaded within a dummy node device in the first pass, the cost value used for loading that partition within each of the real node devices in which a copy is stored may be a sum of the cost of loading that partition within that real node device and the cost of loading another partition already assigned to be loaded within that real node device in the first pass. The assignments for the loading of partitions within real node devices made in both the first and second passes may then be combined to arrive at the lower overall cost assignment for the loading of the partitions within the real node devices.

Additionally, where the operation that is to be performed also necessitates the loading of the partitions of one or more additional data cubes into the volatile storages of the same nodes of the node device grid, the coordinating device may perform one or more further passes of the MILP analysis to derive assignments for the loading of the partitions of each additional data cube. Such operations may include operations that entail the joining of two or more data cubes. Like the aforedescribed second pass of MILP analysis to derive an assignment for loading the partitions of a single data cube, the passes of the MILP analysis performed to derive such assignments for each additional cube may also employ sums of costs in which the costs of loading partitions already assigned to be loaded within each of the node devices may be included.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
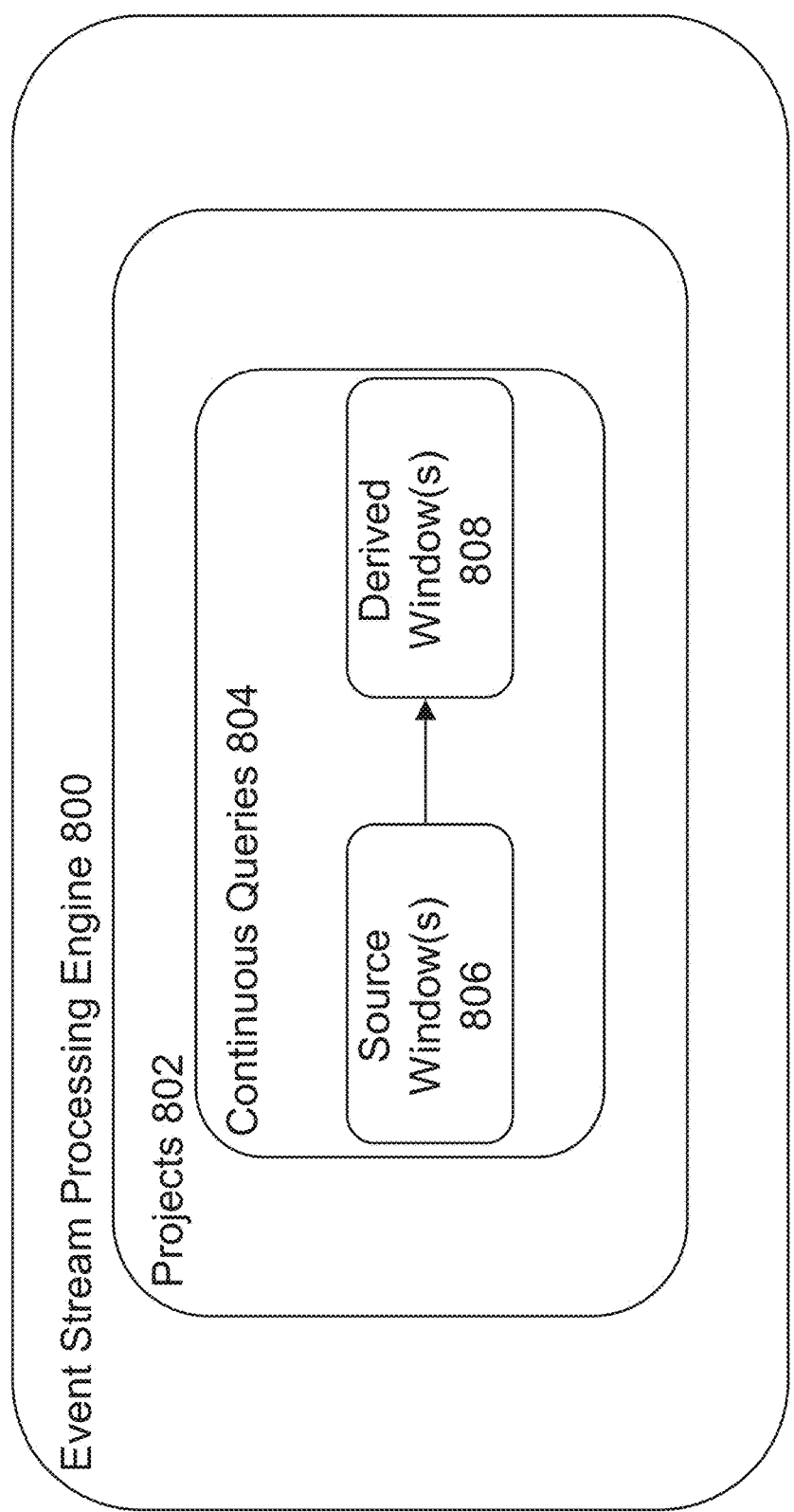
FIG. 8 illustrates a block diagram including components of an Event Stream Processing Engine (ESPE), according to embodiments of the present technology.
Figure 9:
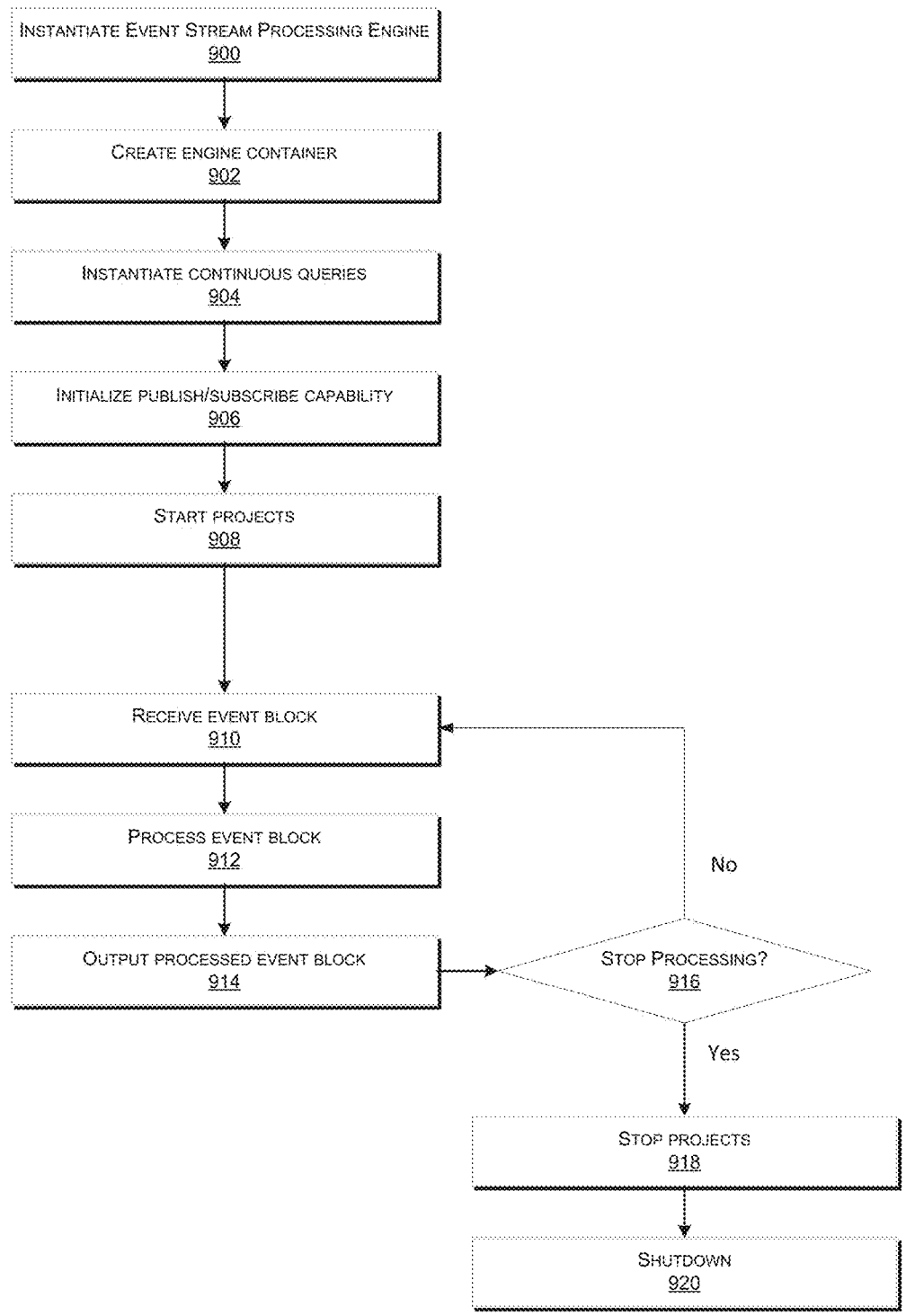
FIG. 9 illustrates a flow chart showing an example process including operations performed by an event stream processing engine, according to some embodiments of the present technology.
Figure 10:
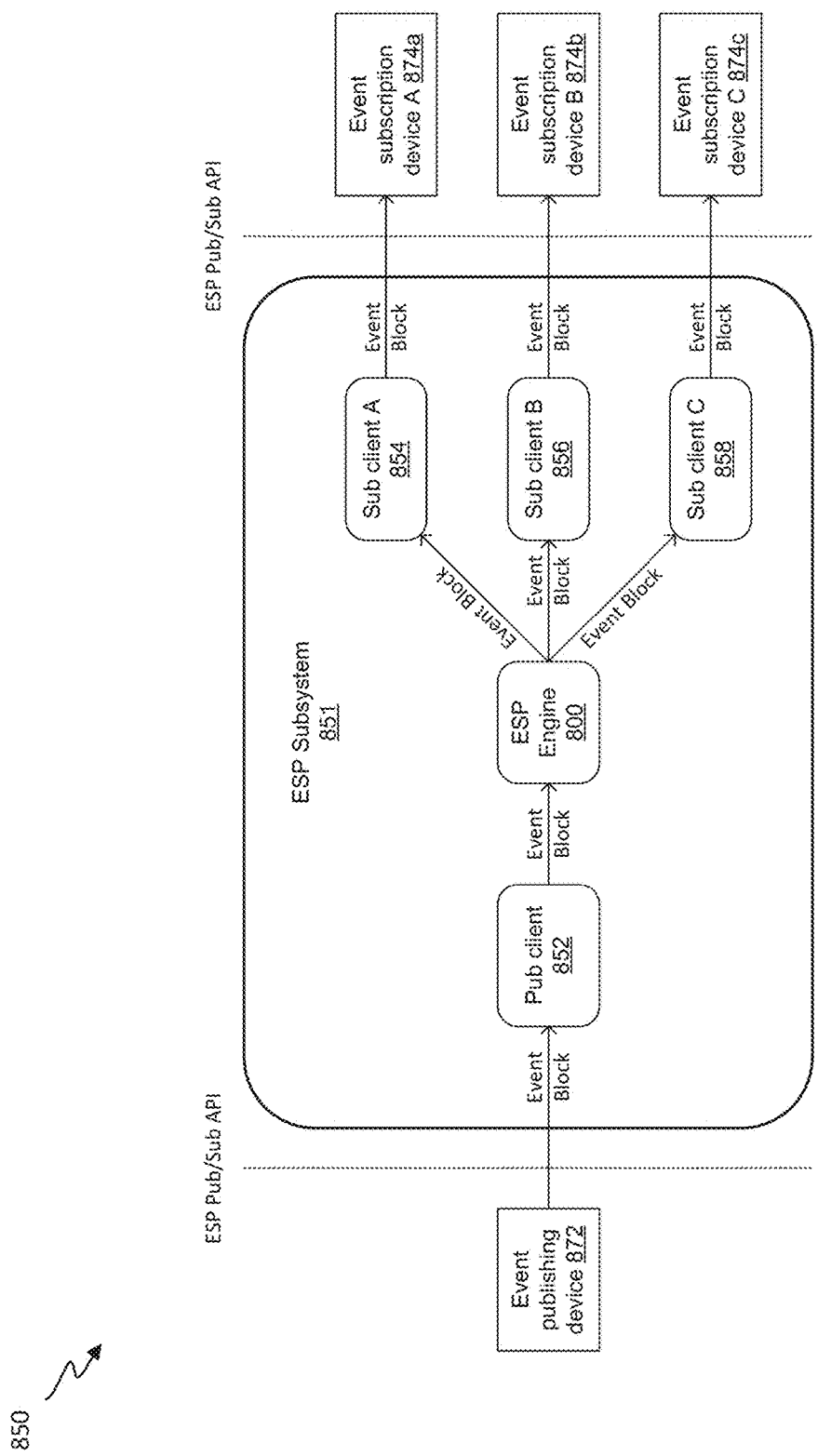
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
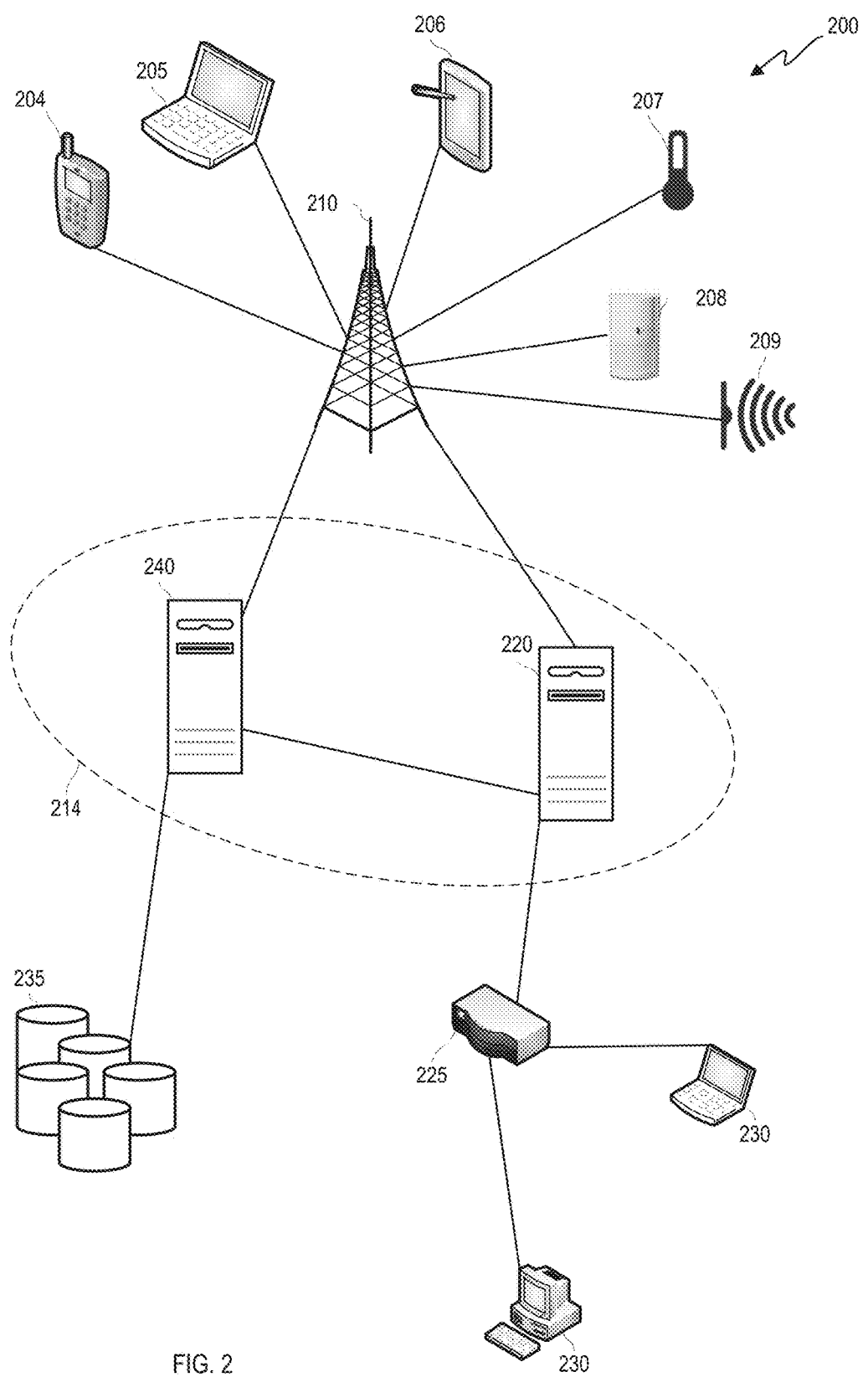
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
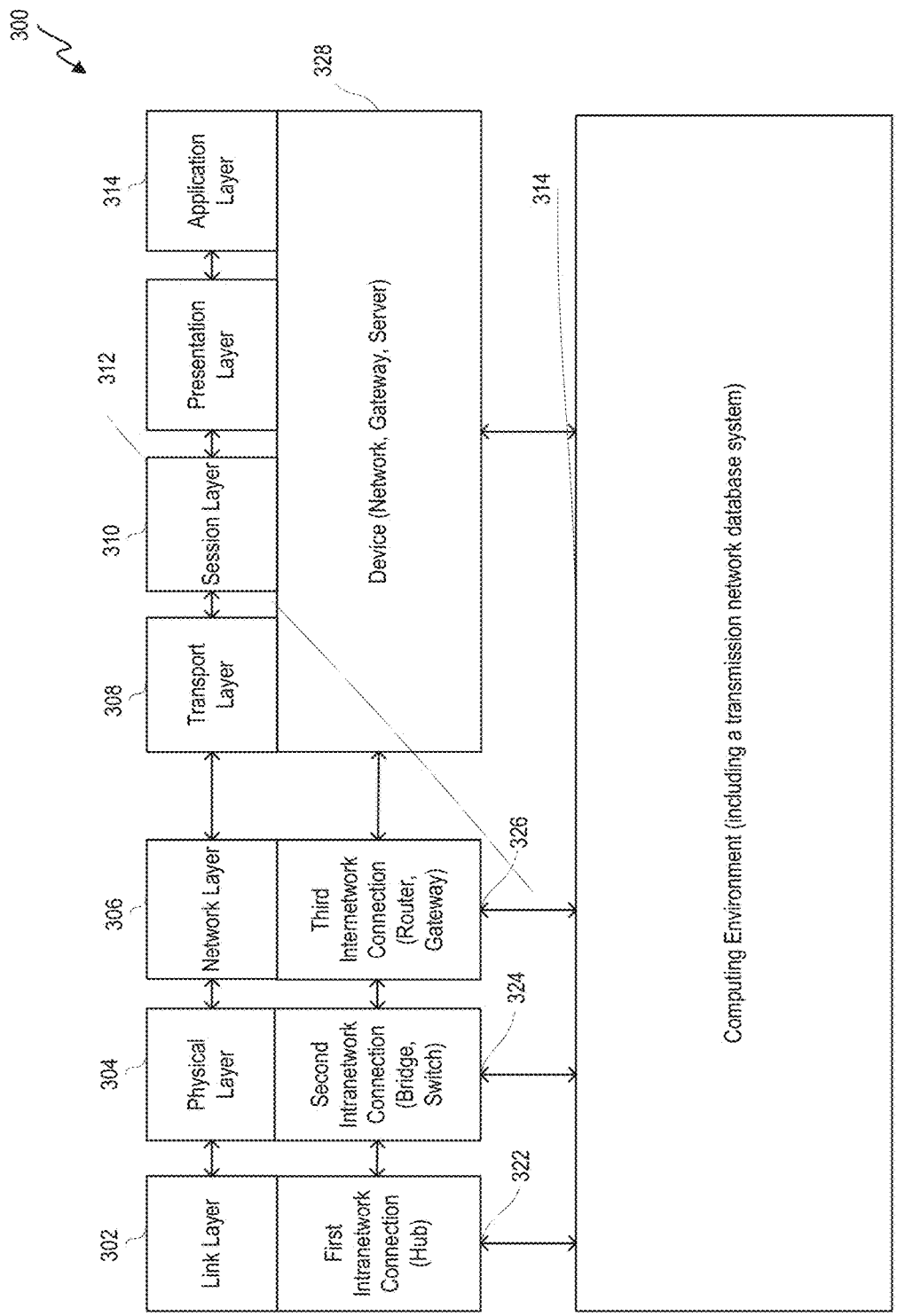
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
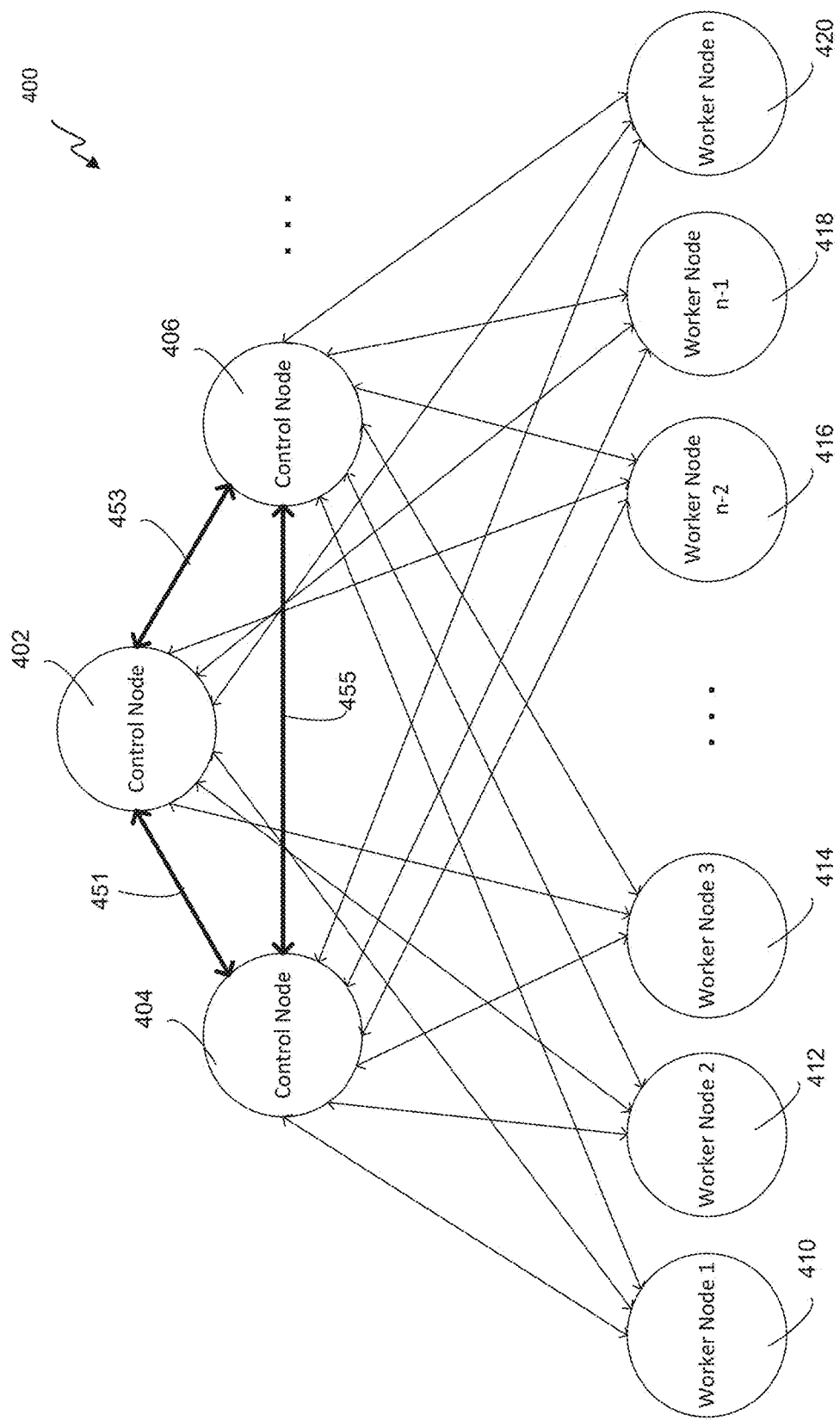
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
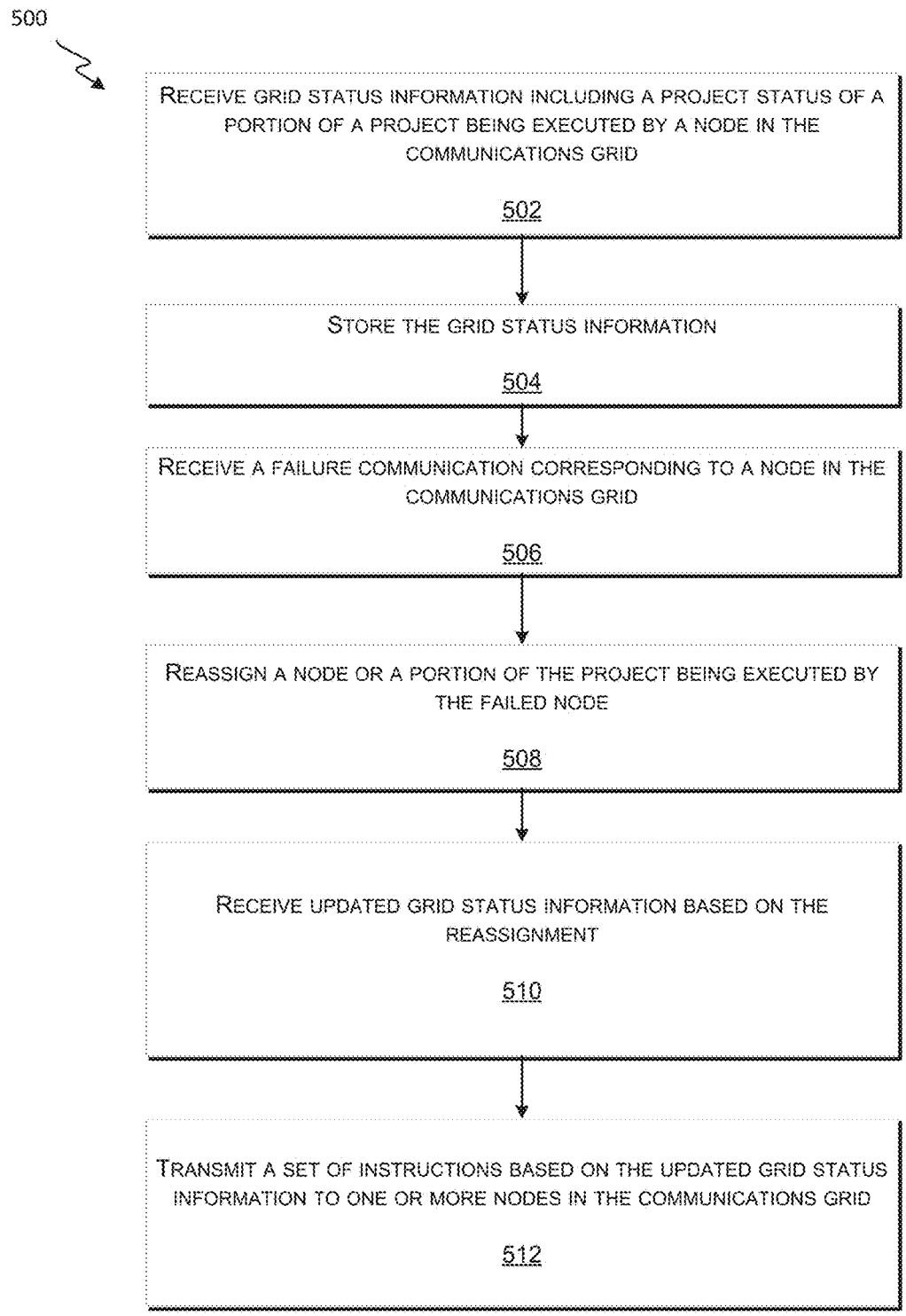
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
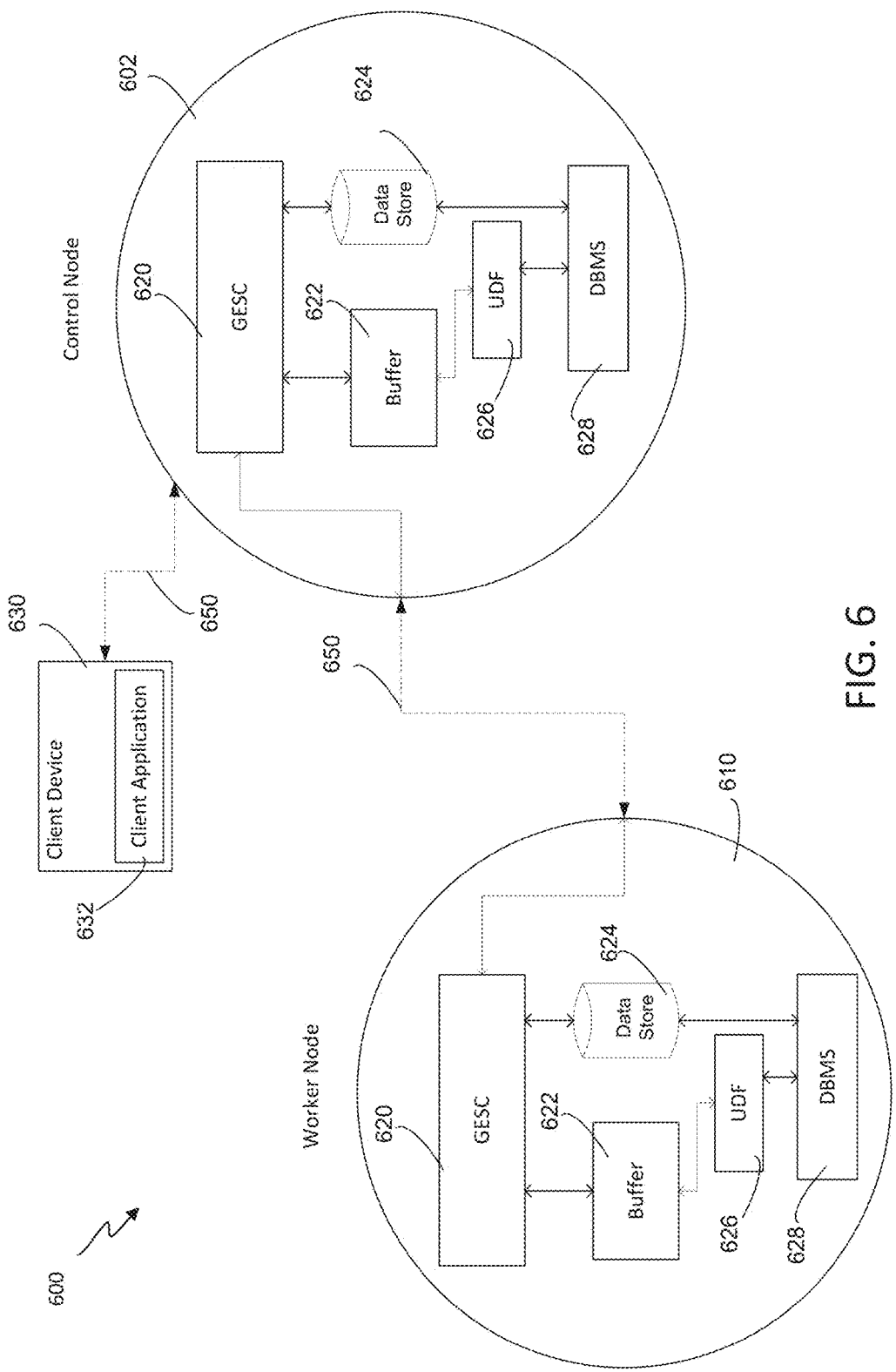
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1.

Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
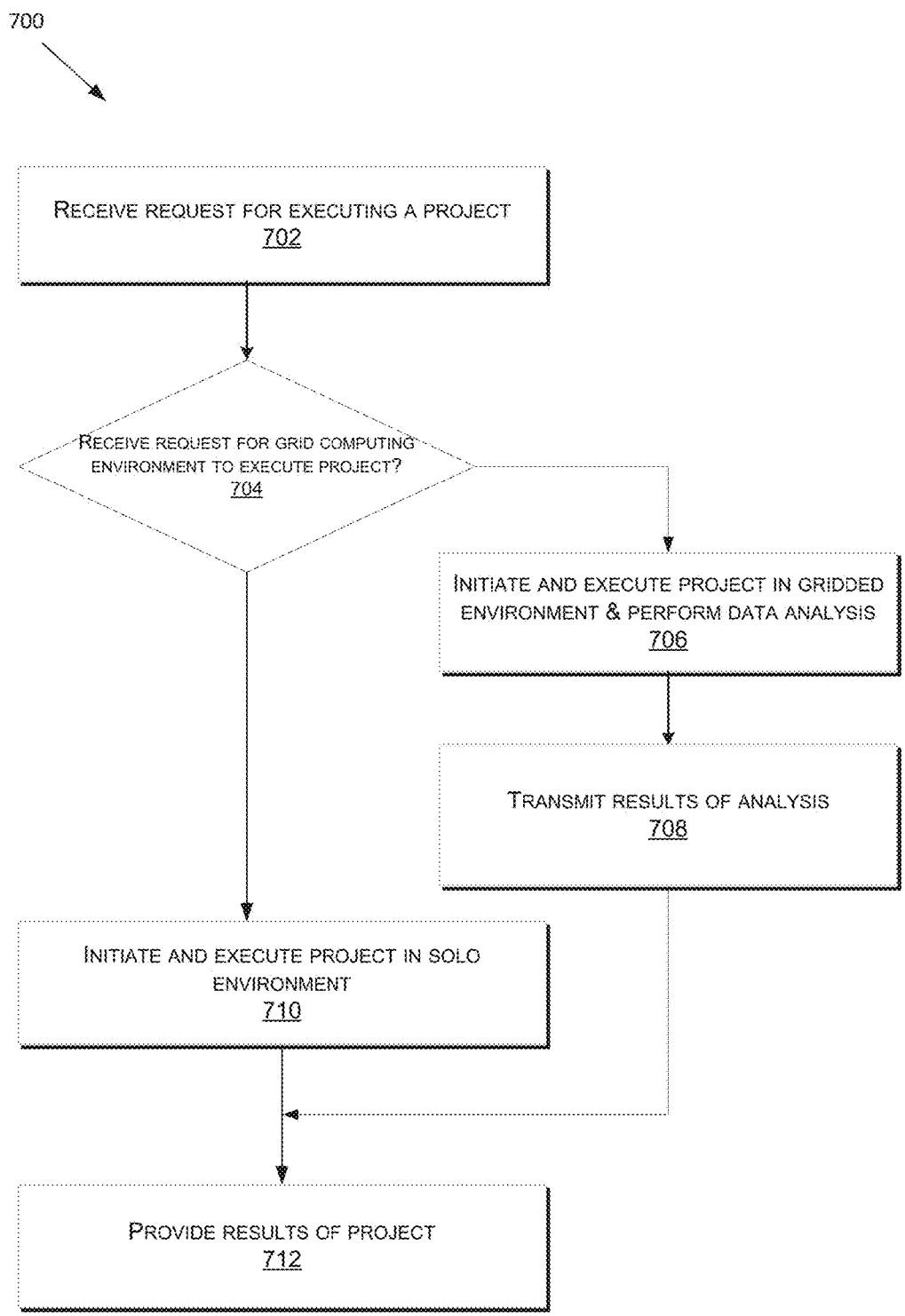
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
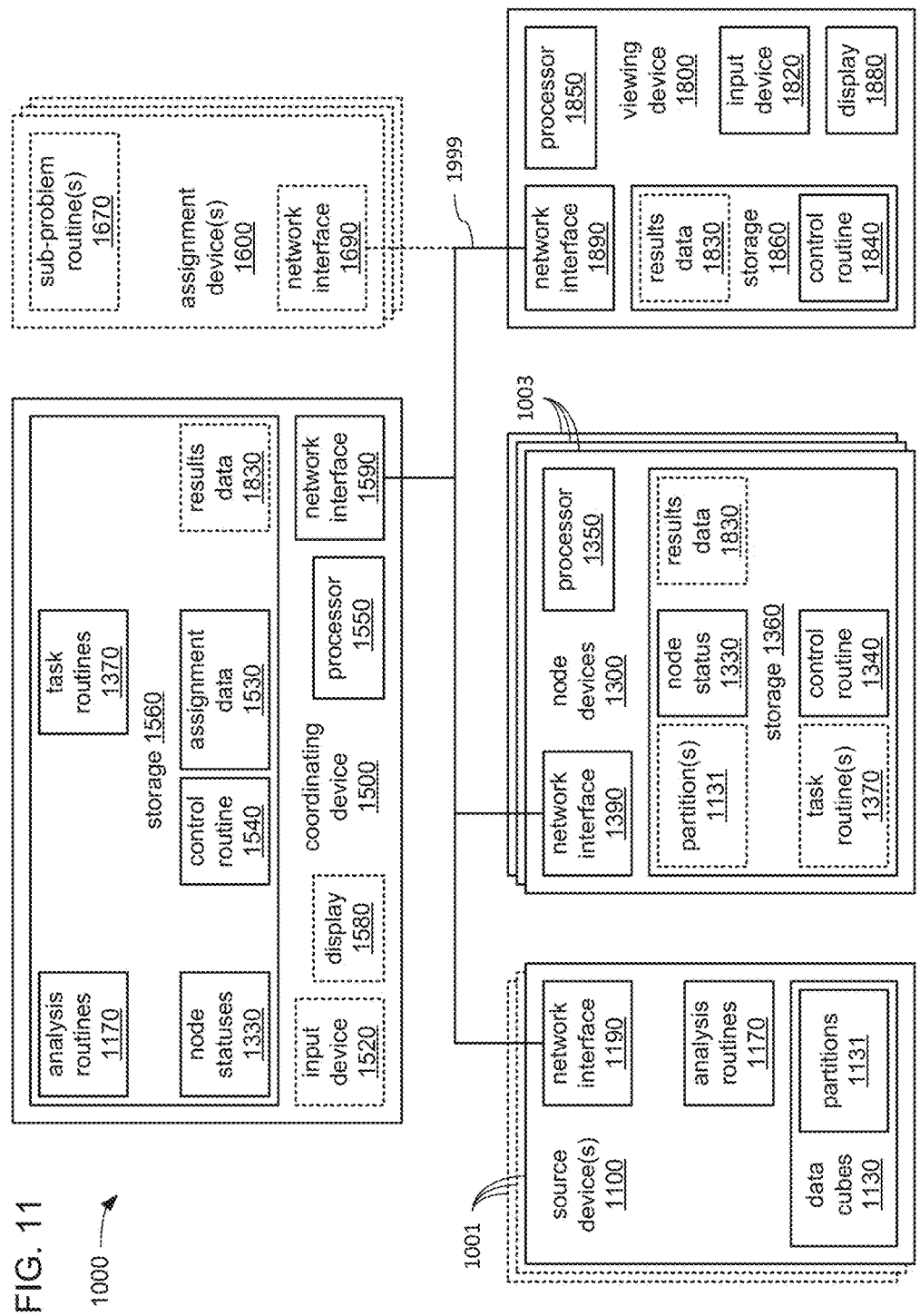
FIG. 11 illustrates an example embodiment of a distributed processing system.

FIG. 11 illustrates a block diagram of an example embodiment of a distributed processing system 1000 incorporating one or more storage devices 1100 that may form a storage device grid 1001, multiple node devices 1500 that may form a node device grid 1005, a coordinating device 1500, one or more assignment devices 1600, and/or a viewing device 1800 that may be connected via a network 1999. The coordinating device 1500 may, through the network 1999, operate the node devices 1300 together as the node device grid 1005 to perform various operations at least partially in parallel with partitions 1131 of one or more data cubes 1130. As will be explained in greater detail, multiple copies of each partition 1131 of multiple partitions 1131 of one or more data cubes 1130 maybe distributed among multiple node devices 1300 for storage within non-volatile storage of the multiple node devices 1300. The multiple node devices 1300 may receive the partitions 1131 of one or more data cubes 1130 from the one or more source devices 1100. In coordinating the performance of one or more operations among the multiple node devices 1300, the coordinating device may assign the loading of different copies of the partitions 1131 from non-volatile storage and into volatile storage within different ones of the multiple node devices 1300. In so doing, the coordinating device 1500 may use multiple passes of a MILP analysis in which the coordinating device 1500 may distribute portions of the MILP analysis among the one or more assignment devices 1600. The result of the performance of an operation with the partitions 1131 of one or more data cubes 1130 may be the generation of results data 1830, which may be transmitted to the viewing device 1800.

As depicted, these devices 1100, 1300, 1500, 1600 and 1800 may exchange communications thereamong related to the performance of operations with the partitions 1131 of one or more data cubes 1130. Such communications may include the exchange of the partitions 1131, analysis routines 1170, node statuses 1330, task routines 1370, and/or results data 1830 via the network 1999. However, one or more of the devices 1100, 1300, 1500, 1600 and/or 1800 may also exchange, via the network 1999, other data entirely unrelated to any assignment or performance of tasks of any analysis routine. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Each of the one or more data cubes 1130 may include data items representing any of a wide variety of types of data associated with any of a wide variety of subjects. By way of example, each data cube 1130 may include scientific observation data concerning geological and/or meteorological events, or from sensors employed in laboratory experiments in areas such as particle physics. By way of another example, each data cube 1130 may include indications of activities performed by a random sample of individuals of a population of people in a selected country or municipality, or of a population of a threatened species under study in the wild.

In some embodiments, the one or more source devices 1100 may perform a collection function in which the one or more source devices 1100 receive data items and may assemble the received data items into one or more data sets over a period of time. In such embodiments, such data items may be received by the one or more source devices 1100 via the network 1999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 1999 to the one or more source devices 1100 where the numerous data items may then be assembled to form one or more data sets. In other embodiments, the one or more source devices 1100 may receive one or more of such data sets from one or more other devices (not shown), such as a grid of other node devices. By way of example, such other devices may perform one or more processing operations that generate data sets (e.g., use a Bayesian analysis to derive a prediction of the behavior of people in a simulation of evacuating a burning building, or to derive a prediction of behavior of structural components of a bridge in response to various wind flows), and may then transmit such data sets as an output to the one or more source devices 1100. Regardless of how the one or more source devices 1100 may receive and/or generate such data sets, the one or more source devices 1100 may generate one or more of the data cubes 1130 therefrom.

The coordinating device 1500 may communicate with the one or more source devices 1100 and/or the multiple node devices 1300 to coordinate the exchange of the partitions 1131 of one or more data cubes 1130 from the one or more source devices 1100 to the multiple node devices 1300. Each of the multiple node devices 1300 may be caused to store a copy of at least one partition 1131 of at least one data cube 1130, at least partially in parallel with others of the multiple node devices 1300. In so doing, the coordinating device 1500 may store indications of what copies of which partitions 1131 of which data cube(s) 1130 are stored by each of the node devices 1300 as part of an assignment data 1530.

The node devices 1300 may provide such distributed storage for multiple copies of each of the partitions 1131 of one or more data cubes 1130 to provide one or both of fault tolerance and/or faster access through the use of parallelism in the reception, storage, retrieval and/or transmission of the partitions via the network 1999, at least partially in parallel. The manner in which each data cube 1130 is divided into the partitions 1131 may depend on numerous factors, including and not limited to, structural features of the manner in which data items are organized within each data cube 1130, and/or dependencies among different data items and/or sets of data items within each data cube 1130. As a result, the partitions 1131 of each data cube 1130 may be of widely varying sizes and/or employ widely varying data structures by which subsets of the data items of each data cube 1130 may be organized within each of its partitions 1131.

In various embodiments, each of the node devices 1300 may incorporate one or more of a processor 1350, a storage 1360 and a network interface 1390 to couple each of the node devices 1300 to the network 1999. The storage 1360 may store at least one partition 1131 of a data cube 1130, node status 1330, a control routine 1340, one or more task routines 1370, and/or at least a portion of the results data 1830. The control routine 1340 and/or the one or more task routines 1370 may each incorporate a sequence of instructions operative on the processor 1350 of each of the node devices 1300 to implement logic to perform various functions, at least partially in parallel with the processors 1350 of others of the node devices 1300.

FIG. 12 depicts an example embodiment of the manner in which the storage 1360 of each of the node devices 1300 may be divided into volatile storage 1361 and non-volatile storage 1363. The volatile storage 1361 may be implemented with one or more volatile storage components 1362 that employ a storage technology that enables relatively speedy access to data and/or routines stored therein, but which is unable to retain data and/or routines stored therein without a continuous supply of electrical power. Such technologies include, and are not limited to, any of a variety of types of random access memory (RAM). The non-volatile storage 1363 may be implemented with one or more non-volatile storage components 1364 that employ a storage technology that is able to retain data and/or routines stored therein regardless of whether electric power continues to be provided, but which is unable to provide access that is as speedy as that provided by various volatile storage technologies on which the volatile storage 1361 may be based. Such technologies for the non-volatile storage 1363 include, and are not limited to, the use of any of a variety of ferromagnetic and/or optical storage media.

As will be familiar to those skilled in the art, advantage may be taken of the speedier access provided by the volatile storage 1361, by storing at least some page-sized portions of data and/or routines that are currently being accessed by the processor 1350, and/or that are predicted to soon be accessed by the processor 1350, within the volatile storage 1361 where the processor 1350 is subjected to less latency in making such accesses. In contrast, page-sized portions of data and/or routines that have not been accessed by the processor 1350 as recently, and/or that are not predicted to soon be accessed by the processor 1350, may remain stored solely within the non-volatile storage 1363. The processor 1350 may be caused by its execution of the control routine 1340 (more specifically, by a page component 1341 thereof) to employ any of a variety of page management algorithms to effect the swapping of page-sized portions of data and/or routines between the non-volatile storage 1363 and the volatile storage 1361 based on the accessing behavior of the processor 1350. The processor 1350 may also be caused by its execution of the control routine 1340 (more specifically, by a monitor component 1342 thereof) to recurringly operate the network interface 1390 to recurringly transmit an instance of the node status 1330 to provide the coordinating device 1500 with indications of the current status of the node device 1300, including the current status of such resources of the node device as the volatile storage 1361 and/or the non-volatile storage 1363.

Returning to FIG. 11, in various embodiments, the coordinating device 1500 may incorporate one or more of a processor 1550, a storage 1560, an input device 1520, a display 1580, and a network interface 1590 to couple the coordinating device 1500 to the network 1999. The storage 1560 may store the analysis routines 1170, the node statuses 1330, the one or more task routines 1370, assignment data 1530, a control routine 1540, one or more sub-problem routines 1670, and/or the results data 1830. The one or more analysis routines 1170, the control routine 1540, and/or the one or more sub-problem routines 1670 may each incorporate a sequence of instructions operative on the processor 1550 to implement logic to perform various functions.

In various embodiments, the viewing device 1800 incorporates one or more of a processor 1850, a storage 1860, an input device 1820, a display 1880, and a network interface 1890 to couple the viewing device 1800 to the network 1999. The storage 1860 may store one or more of a control routine 1840 and the results data 1830. The control routine 1840 may incorporate a sequence of instructions operative on the processor 1850 to implement logic to perform various functions. The processor 1850 may be caused by its execution of the control routine 1840 to operate the network interface 1890 to receive the results data 1830 from one of the node devices 1300 or from the coordinating device 1600 via the network 1999. In some embodiments, the processor 1850 may also be caused to generate a visualization based on the results data 1830 to present a depiction of the results of the performance of the analysis by the multiple node devices 1300 of the node device grid 1003 on the display 1880.

Any of a variety of operations may be performed with the partitions 1131 of one or more data cubes 1130, including and not limited to, arithmetic and/or bitwise operations, data normalization operations to alter formatting and/or encoding (e.g., conversion of date and/or time formats, conversion between binary representations of values in storage, etc.), statistical calculations and/or analyses (e.g., deriving averages, mean values, median values, etc.), and/or data transfer operations (e.g., generating and/or transmitting copies of the partitions 1131, etc.). Regardless of the what the one or more operations to be performed by the multiple node devices 1330 with the partitions 1131 of a data cube 1130 may be, such performance necessarily entails access to those partitions 1131 by the processors 1350 of the multiple node devices 1300, and this necessarily entails the loading of page-sized portions of those partitions 1131 from the non-volatile storage 1363 and into the volatile storage 1361 within the multiple node devices 1300.

The performance of such operations, at least partially in parallel, by the multiple node devices 1300, may be triggered at the coordinating device 1500 in any of a variety of ways, including in response to requests to do so received from any of a variety of sources. In some embodiments, in executing the control routine 1540, the processor 1550 of the coordinating device 1500 may be caused to await the receipt of a request to perform one or more operations with the partitions 1131 of one or more data cubes 1130. Such a request may be received from another routine also executed within the coordinating device 1500, such as one or more of the analysis routines 1170. Such a request may be for an operation that will provide data (e.g., the results data 1830) that may be needed as an input to an analysis carried out by one of the analysis routines 1170. The one or more analysis routines 1170 may have been stored alongside one or more data cubes 1130 within the one or more storage devices 1100 as analysis routines that are meant to be performed with the one or more data cubes 1130. The one or more analysis routines 1170 may be provided to and stored by the coordinating device 1500 for later execution as part of the storage of partitions 1131 among the multiple node devices 1300.

In other embodiments, in executing the control routine 1540, the processor 1550 may be caused to operate the network interface 1590 to monitor for and receive a request from another device (e.g., the viewing device 1800) to perform one or more operations with the partitions 1131 of one or more data cubes 1130. The processor 1850 of the viewing device 1800 may be caused by its execution of the control routine 1840 to operate the input device 1820 and/or the display 1880 of the viewing device 1800 to provide a user interface by which a manually entered command to perform one or more of such operations may be received. Upon receipt of such a manually entered command, the processor 1850 may be caused to operate the network interface 1890 to transmit that command to the coordinating device 1500 via the network 1999. Alternatively or additionally, the processor 1550 may be caused to operate the input device 1520 and/or the display 1580 to directly provide a user interface (UI) by which such a manually-entered command may be received. As still another alternative, one or more of such operations may be caused to occur on a timed basis as part of the processor 1550 being caused to perform data integrity tests and/or other maintenance operations on the node device grid 1003 that entail the loading of data from non-volatile storage and into volatile storage within one or more of the multiple node devices 1300.

Regardless of the source of the trigger to perform an operation that entails the loading of the partitions 1131 of at least one data cube 1130, in response, the processor 1550 may be caused by the control routine 1540 to derive an assignment for the loading of particular ones of the partitions 1131 of at least one data cube 1130 from non-volatile storage 1363 and into volatile storage 1361 within particular ones of the multiple node devices 1300. In so doing, the processor 1550 may be caused by the control routine 1540 to take into account the differing costs of loading each copy of each partition 1131 within each of the multiple node devices 1300 in which a copy of at least one of the partitions 1131 is stored. As discussed, the processor 1550 may be caused to use a MILP analysis to derive the assignment. In some embodiments, the processor 1550 may split the MILP analysis into analyses of a main problem and one or more sub-problems as part of implementing the MILP analysis as an iterative process in which various solutions are tried through such multiple iterations. In so doing, the processor 1550 may delegate the solving of the one or more sub-problems to the one or more assignment devices 1600, such that the processor 1550 may cooperate with the one or more assignment devices 1600 to derive the assignment.

Also in response to the trigger to perform such an operation, the processor 1550 may be caused by the control routine 1540 to derive one or more of the task routines 1370 to be distributed to the multiple node devices 1300. Each of the task routines 1370 may provide an indication of which particular partition 1131 is to be loaded into volatile storage 1361 from non-volatile storage 1363 within a particular one of the node devices 1300. Each of the task routines 1370 may also include instructions for the performance of one or more operations with that particular partition 1131 by that particular one of the multiple node devices 1300. The processor 1350 of each of the multiple node devices 1300 may be caused by the control routine 1340 to so load the particular partition 1131 and/or to perform the particular one or more operations specified in the instance of the task instructions 1370 received from the coordinating device 1500.

Figure 13A:
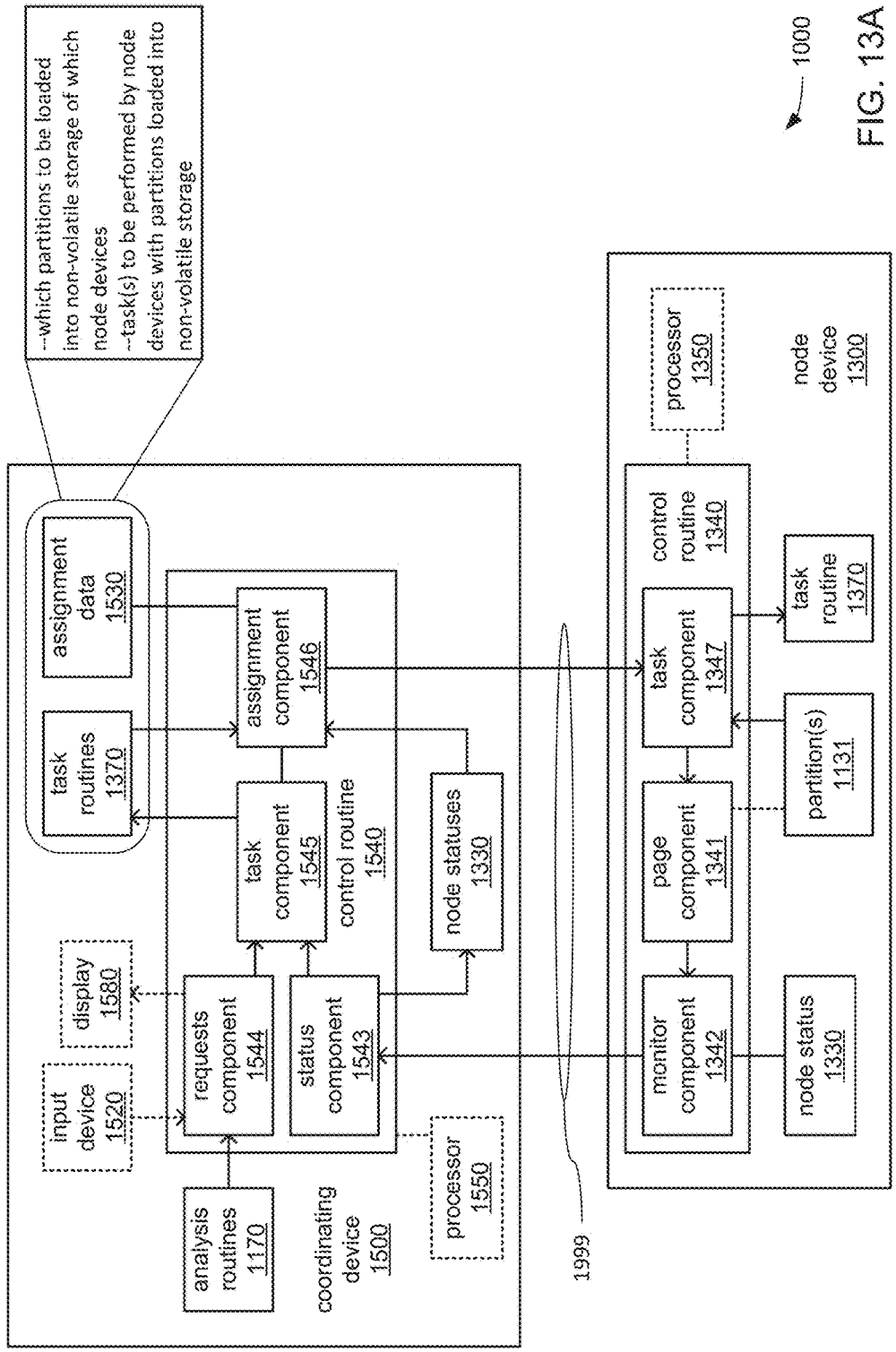
FIGS. 13A and 13B each illustrate an example embodiment of derivation and use of an assignment for loading of partitions within node devices.
Figure 13B:
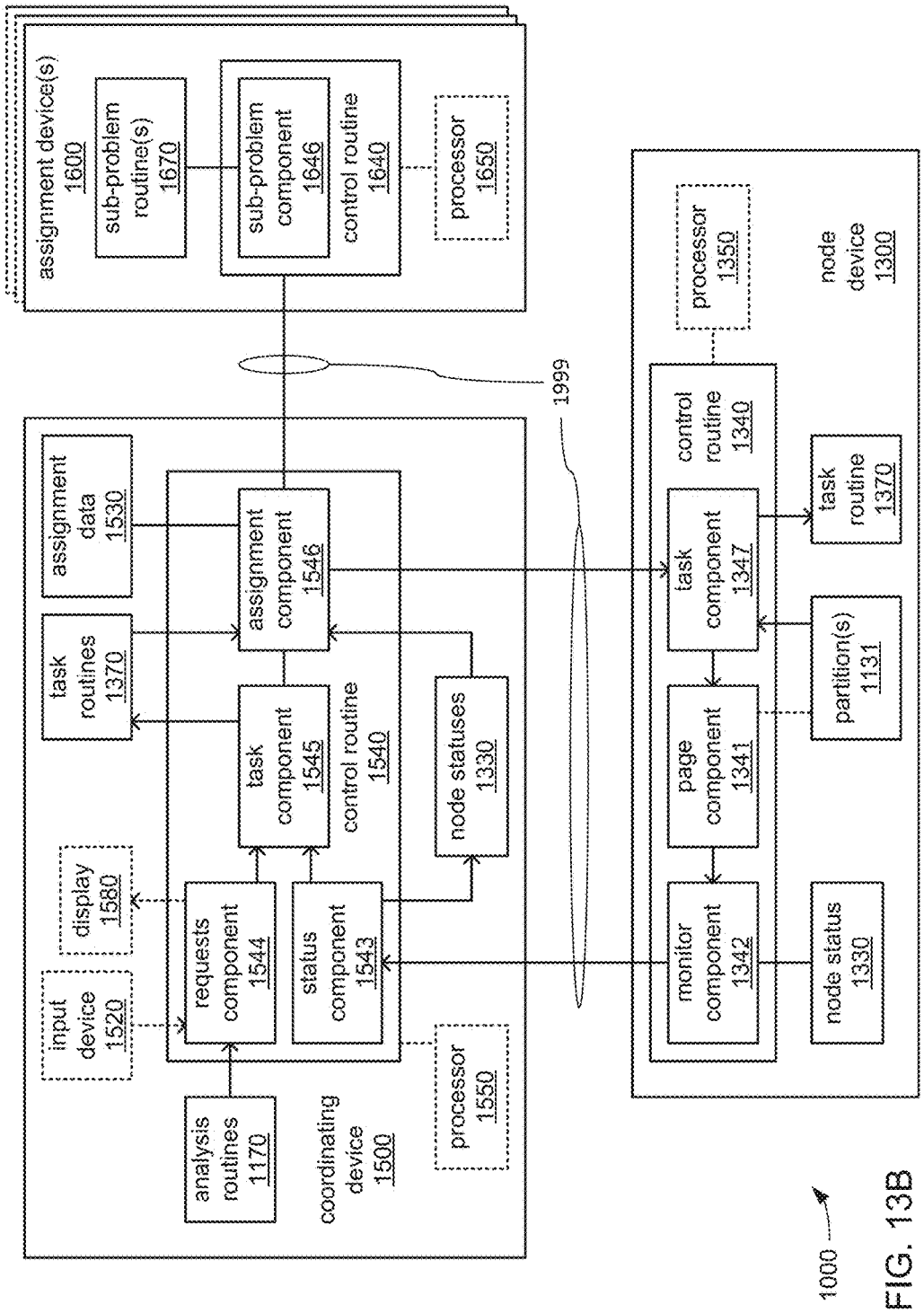

FIGS. 13A and 13B each illustrate an example embodiment of the derivation and use of an assignment for the loading of partitions 1131 of at least one data cube 1130 within multiple ones of the node devices 1300 in greater detail. What is depicted in FIG. 13A differs from what is depicted in FIG. 13B inasmuch as the performance of a MILP analysis to derive an assignment for the loading of partitions 1131 within node devices 1300 occurs entirely within the coordinating device 1500 in FIG. 13A, but is performed in a distributed manner between the coordinating device 1500 and one or more assignment devices 1600 in FIG. 13B.

Referring to both FIGS. 13A and 13B, as recognizable to those skilled in the art, each of the one or more analysis routine 1170, the control routine 1340, the multiple tasks routines 1370, the control routine 1540 and/or the one or more sub-problem routines 1670, including the components of which each may be composed, are selected to be operative on whatever type of processor or processors that are selected to implement applicable ones of the processors 1350, 1550 and/or 1650. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 1350, 1550 and/or 1650. Where one or more device drivers are included, those device drivers may provide support for any of a variety of other components, whether hardware or software components, of the node devices 1300, the coordinating device 1500 and/or the assignment device(s) 1600.

As depicted, the control routine 1340 executed by the processor 1350 of each of the multiple node devices 1300 may include the monitor component 1342 to cause the processor 1350 to recurringly transmit an instance of the node status 1330 to the coordinating device 1500 via the network 1999. As earlier mentioned, and as more specifically depicted in FIG. 12, each of the instances of the node status 1330 that may be recurringly transmitted to the coordinating device 1500 may include indications of the current status of at least the volatile storage 1361 and/or the non-volatile storage 1363 within one of the multiple node devices 1300. More broadly, each transmitted instance of the node status 1330 may include indications of what processing, storage and/or network bandwidth resources that are provided by the one of the node devices 1330 that so transmits it. Such indications may also include indications of relative levels of speed, latency, occurrences of errors, etc. concerning one or more of such resources. Alternatively or additionally, each such instance of the node status 1330 may include indications of degree of use and/or degree of availability for use of each of such resources. Also alternatively or additionally, each such instance of the node status 1330 may include indications of progress made in the performance of tasks that the transmitting one of the node devices 1300 may have been instructed to perform by the coordinating device 1500. In addition to the indications provided by the contents of each instance of the node status 1330, some embodiments, the fact of the recurring transmission of instances of the node status 1330 may be used as a form of "heartbeat" signal that confirms at least a selected baseline of ongoing functionality of the node devices 1300. Thus, a cessation in the receipt of recurringly transmitted instances of the node status 1330 from a particular one of the node devices 1300 may be interpreted as an indication of a failure of that particular one of the node devices 1300.

Correspondingly, and as depicted, the control routine 1540 executed by the processor 1550 of the coordinating device 1500 may include a status component 1543 to cause the processor 1550 to monitor for and receive the instances of the node status 1330 transmitted by each of the multiple node devices 1300. The processor 1550 may be caused to store at least the most recently received instances of the node status 1330 from each of the multiple node device 1300, thereby creating a set of information concerning the current status of resources provided by and/or the progress made in performing tasks by each of the multiple node devices 1300. It may also be the status component 1543 that causes the processor 1550 to interpret a cessation of receipt of instances of the node status 1330 from a particular node device 1300 as an indication of failure of that particular node device 1300.

As also depicted, the control routine 1540 may include a requests component 1544 to cause the processor 1550 to monitor for the receipt of requests for a performance, by the multiple node devices 1300, of one or more operations with the partitions 1131 of one or more data cube 1130. More specifically, the processor 1550 may be caused to operate the input device 1520 and/or the display 1580 to provide a UI in which the processor 1550 may be caused to monitor the input device 1520 for the reception of such a request that may be manually entered via the input device 1520. Alternatively or additionally, the processor 1550 may be caused to monitor for the reception of such a request from another device (e.g., the viewing device 1800) via the network 1999. As still another alternative, the processor 1550 may be caused to monitor for instances of such a request being received by another routine executed within the coordinating device 1500, such one of the one or more analysis routines 1170.

As further depicted, the control routine 1540 may include a task component 1545 to cause the processor 1550 to cause the performance, by the multiple node devices 1300, of the one or more operations that may be specified in a request received through the requests component 1544, either from within the coordinating device 1500 or from another device via the network 1999. More specifically, the task component 1545 may cause the processor 1550 to generate multiple task routines 1370, each of which may be generated to be transmitted to a particular one of the multiple node devices 1300 to provide instructions thereto for performing the requested one or more operations. In some embodiments, the data items of a particular data cube 1130 may be homogenous such that the type of data included within each of the partitions 1131 may be of an identical type such that the one or more operations to be performed with each of the partitions 1131 may be identical. In such embodiments, the instructions provided in each of the multiple task routines 1370 to a different one of the multiple node devices 1300 may be identical. However, in other embodiments, the data items of a particular data cube 1130 may not be homogenous such that there may be some variation in the type of data included among the different partitions 1131 such that there may be differences in the manner in which the one or more operations are to be carried out by each one of the multiple node devices 1300. In such embodiments, the instructions provided in different ones of the multiple task routines 1370 to different ones of the multiple node devices 1300 may differ.

As still further depicted, the control routine 1540 may include an assignment component 1546 to cause the processor 1550 to derive assignments for the loading of partitions 1131 of a particular data cube 1130 in support of the performance of one or more operations specified in a request with the particular data cube 1130. As part of deriving the assignment, the processor 1550 may be caused to retrieve indications, from the assignment data 1530, of which ones of the multiple node devices 1300 have been assigned to store a copy of at least one partition 1131 of the particular data cube 1130. As previously discussed, the assignment data 1530 may include indications of which node device 1300 each copy of each partition 1131 of each data cube 1130 has been stored within. Also as part of deriving the assignment, the processor 1550 may be caused to retrieve, from the stored instances of node statuses 1330 from each of the node devices 1300, indications of which node devices 1300 are currently available. The processor 1550 may compare such indications provided by the assignment data 1530 to such indications provided by the stored instances of the node statuses 1330 to determine which ones of the node devices 1300 in which a copy of at least one of the partitions 1131 of the particular data cube 1130 was stored is among the node devices 1300 that are currently available. It may be that one or more of the node devices 1300 within which a copy of at least one partition 1131 of the particular data cube 1130 was stored has since suffered a malfunction or other event, and is not currently available. One or more other node device 1300 may have since become available to maintain the functionality of the node device grid 1003, but such other node devices 1300 may not store any copy of any partition 1131 of the particular data cube 1130.

From such a comparison of such retrieved information, the processor 1550 may be caused by the assignment component 1546 to determine the quantity of the node devices 1300 that are currently available and that have stored within them a copy of at least one partition 1131 of the particular data cube 1130. With that node quantity determined, the processor 1550 may then be caused to compare that node quantity to the quantity of partitions 1131 into which the particular data cube 1130 was divided. If that node quantity is not less than that partition quantity, then the processor 1550 may be caused by the assignment component 1546 to use a linear assignment analysis to generate the assignment for the loading of the partitions 1131 within the multiple node devices 1300 of the node quantity. Such use of a simpler linear assignment analysis may be made possible by the fact that there are enough node devices 1300 that are available and that store a copy of at least one of the partitions 1131 such that each of the partitions 1131 of the particular data cube 1130 is able to be assigned to be loaded within a separate one of the node devices 1300. However, if the node quantity is less than the partition quantity, then the processor 1550 may be caused to use a MILP analysis to derive the assignment.

Where such a simpler linear assignment analysis is able to be used as a result of the node quantity not being less than the partition quantity (e.g., being equal to or greater than the partition quantity), the particular linear analysis performed may be defined as the minimization of the following objective function:

$$\sum_{i \in N} \sum_{j \in N-U+D} c_{i,j} x_{i,j}$$

with the following constraints:

$$\sum_{i \in N} x_{i,j} = 1 \quad \text{for} \quad j \in N - U + D$$

$$\sum_{j \in N-U+D} x_{i,j} = 1 \quad \text{for} \quad i \in N$$

$$x_{i,j} \in \{0, 1\} \quad \text{for} \quad i \in N, j \in N - U + D$$

where the decision variable $x_{i,j}$ for which node device 1300 each partition 1131 is assigned to be loaded within is given the value of one where such loading is assigned and a value of zero where such loading is not assigned, where the quantity U of node devices 1300 that have become unavailable after storing a copy of at least one partition 1131 is zero, where the quantity D of dummy node devices that are accordingly need to be instantiated to replace such a quantity U is zero, and where the cost $c_{i,j}$ ascribed to every copy of every partition 1131 is zero.

Figure 14A:
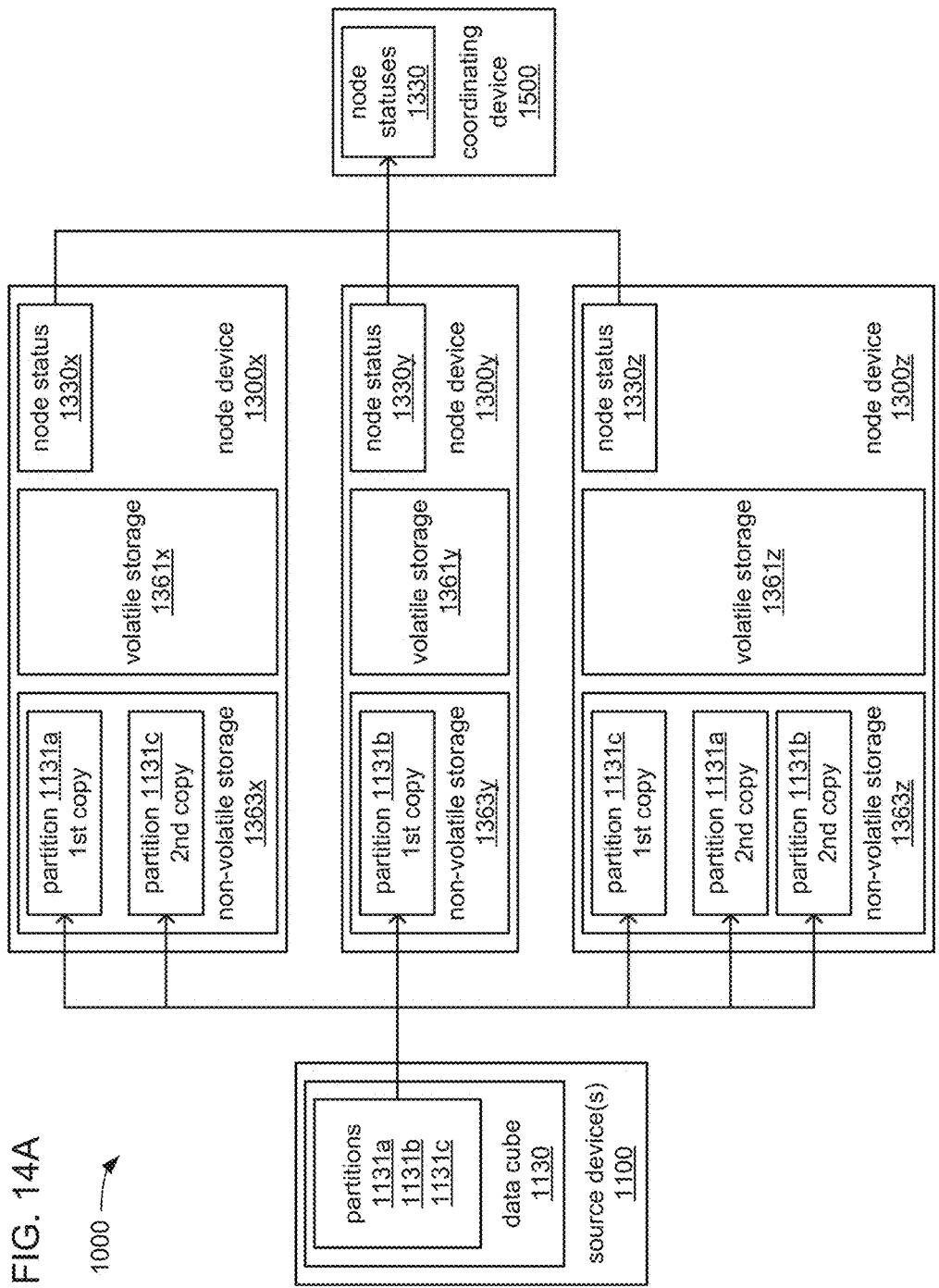
FIGS. 14A and 14B, together, illustrate an example of use of a linear assignment analysis to derive an assignment for loading partitions of a single data cube within multiple node devices.
Figure 14B:
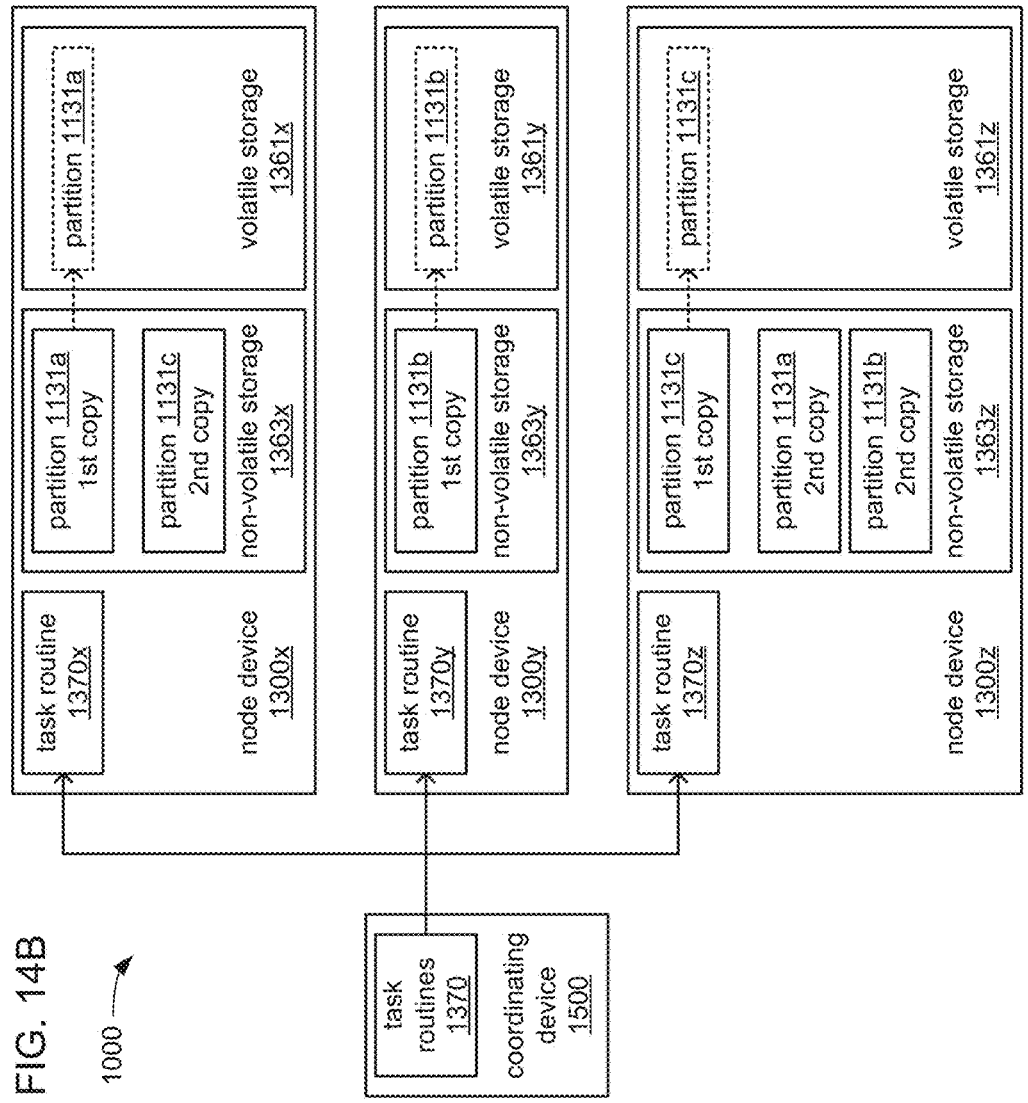

Stated differently, in the performance of such a linear assignment of each partition 1131 to be loaded within a separate one of the node devices 1300, the costs of loading any copy of any of the partitions 1131 of the particular data cube 1130 may be entirely ignored by setting all of those costs to the same value, such as the value of zero. With the costs thereby made equal for the loading of all copies of all of the partitions 1131 of the particular data cube 1130, all combinations of assignments of loading of the partitions 1131 within the multiple node devices are also caused to have an equal overall cost, which may also be zero where the cost for loading every copy of every partition 1131 has been set to the value of zero. FIGS. 14A-B, which are discussed below in detail, depict an example of such use of a linear assignment analysis.

However, where a MILP analysis is to be used as a result of the node quantity being less than the partition quantity, a first pass of the MILP analysis may be defined with the very same objective function and constraints as were introduced above for the simpler linear assignment. However, unlike the above case in which a linear assignment analysis is used, the value for the quantity U of node devices 1300 that have become unavailable after storing a copy of at least one partition 1131 may be a non-zero value, as may also be the quantity D of dummy node devices that accordingly need to be instantiated to replace the nonzero quantity U. More specifically, the quantity D of dummy node devices that are instantiated may be the quantity needed to bring the node quantity up to an amount that is equal to the partition quantity. Adding dummy node devices to cause the node quantity to at least equal the partition quantity may be done to enable the use of a MILP analysis.

Also, unlike the above earlier case in which a linear assignment was used, the cost $c_{i,j}$ for each copy of each partition 1131 that is stored within one of the node devices 1300 may be set to reflect a characteristic of that partition 1131, such as its size as measured in a unit such as, and not limited to, bytes, words, doublewords, quadwords, kilobytes, megabytes, gigabytes, etc. However, a very high cost M may be ascribed to the loading any of the partitions 1131 within any of the instantiated dummy node devices. The value M may be chosen to be greater than the sum of all of the costs $c_{i,j}$ that are based on a partition characteristic. This may be done to make the assignment for the loading of any of the partitions 1131 within any of the dummy node devices into the least desirable assignment possible, since each of the dummy node devices is a fictitious node device within which no such actual loading and/or use of a partition 1131 in the performance of an operation could ever actually occur.

Figure 15A:
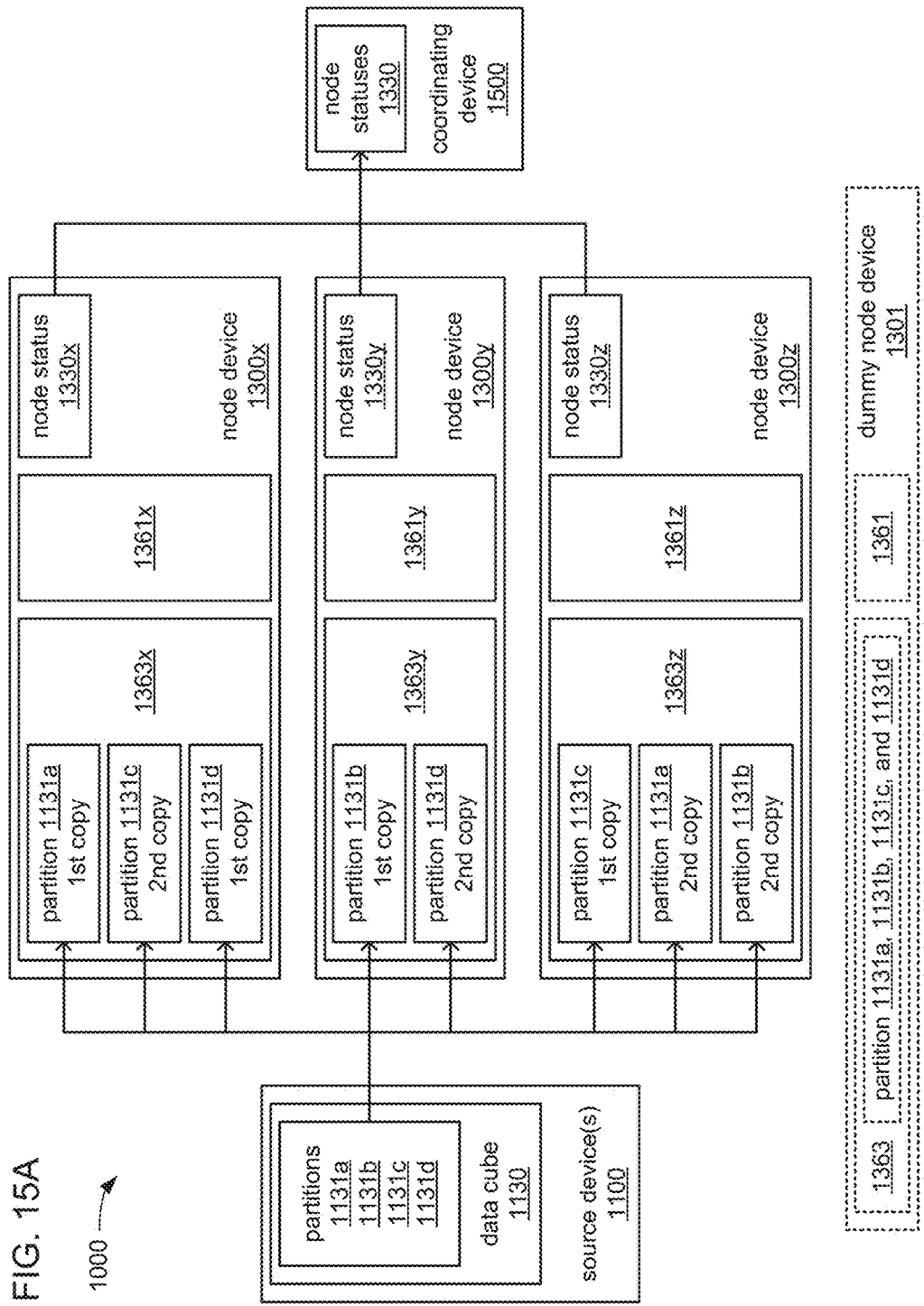
FIGS. 15A, 15B and 15C, together, illustrate an example of use of a two-pass MILP analysis to derive an assignment for loading partitions of a single data cube within multiple node devices.
Figure 15B:
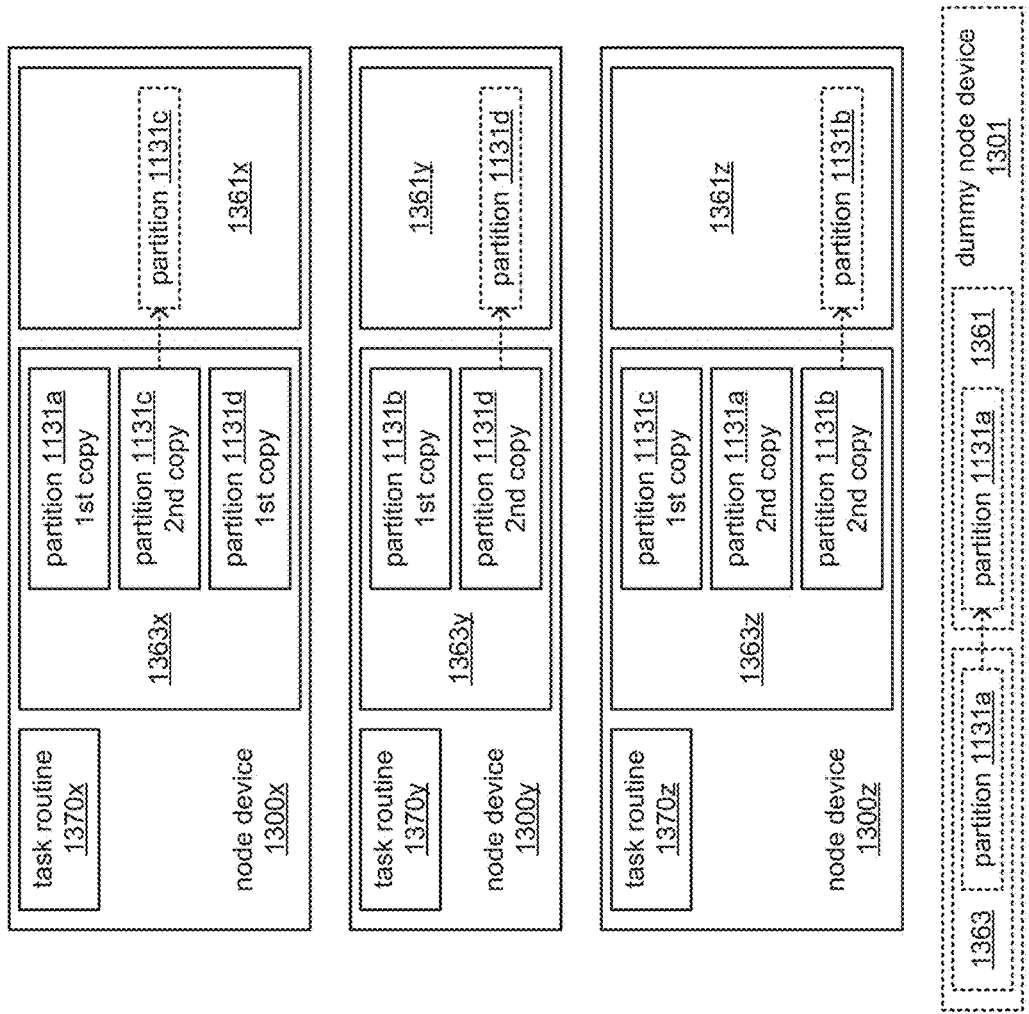
Figure 15C:
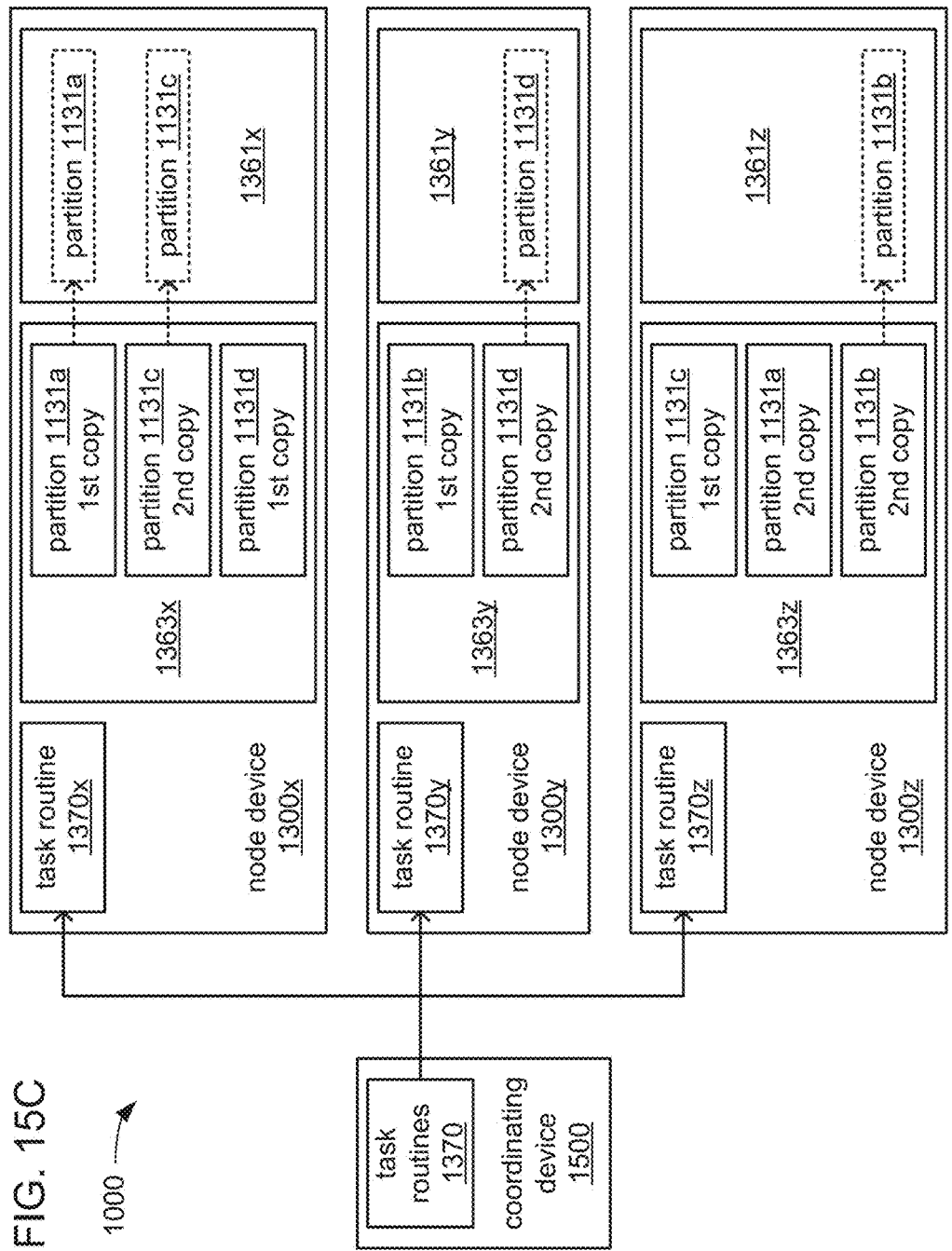

Following the performance of the first pass of the MILP analysis, a second pass of the MILP analysis may be performed only with the one or more partitions 1131 of a set R that were assigned to be loaded within a dummy node device. Thus, the second pass of the MILP analysis is to change the assignment for the loading of any of the partitions 1131 within a dummy node device into an assignment for loading of each of those partitions 1131 within one of the real node devices 1300. The particular second pass MILP analysis performed may be defined as the minimization of the following objective function:

$$\sum_{i \in R} x_{i,j} = 1 \quad \text{for} \quad j \in N - U + D$$

$$\sum_{j \in N-U+D} x_{i,j} = 1 \quad \text{for} \quad i \in R$$

$$x_{i,j} \in \{0, 1\} \quad \text{for} \quad i \in R, j \in N - U + D$$

with the following constraints:

$$\max_{i \in R, j \in N-U+D} \{c_{i,j} x_{i,j}\}$$

where, the cost $c_{i,j}$ ascribed to every copy of one of the partitions in the set R is a sum of the cost of loading whatever other partition may have been assigned for loading within the same real node device plus a cost based on a characteristic of the partition such as its size. Such use of a sum for each such cost may be in recognition of the fact that the reassignment in the second pass of each partition of the set R that was assigned in the first pass necessarily entails causing more than one partition to be assigned for loading within one or more of the real node devices 1300. FIG. 15A-C, which are discussed below in detail, depict an example of such use of a two-pass MILP analysis.

As previously discussed, in FIG. 13A, the processor 1350 may be caused by the assignment component 1546 to perform the entirety of such MILP analyses. In contrast, in FIG. 13B, the processor 1350 may be caused by the assignment component 1546 to divide the MILP analysis into a distinct main problem and one or more sub-problems. The processor 1350 may then be caused, for each sub-problem, to generate and transmit one of the sub-problem routines 1670 to one of the assignment devices 1600 for execution by the processor 1650 thereof to solve that sub-problem. As will be familiar to those skilled in the art of MILP analyses, the processor 1550 may be caused to cooperate with the processor(s) 1650 of the one or more assignment devices 1600 to which a sub-problem has been so assigned in what may be multiple iterations of derivation and fitting of solutions to arrive at an assignment for the loading of partitions 1131.

Referring again to both FIGS. 13A-B, regardless of the exact manner in which an assignment is derived, the processor 1550 may be caused to store indications of the assignment within the assignment data 1530. The processor 1550 may then be caused by the assignment component 1546 to use such stored indications of the assignment to augment each of the task routines 1370 associated with one of the partitions 1131 with an indication of which node device 1300 that partition 1131 is assigned to be loaded within. The processor 1550 may then be caused to transmit each of the task routines 1370 to its corresponding one of the node devices 1300. In so doing, the processor 1550 provides each of the node devices to which at the loading of at least one partition has been assigned with an indication of which partition(s) are to be so loaded, and what one or more operations are to be performed therewith after such loading.

As depicted in both FIGS. 13A-B, the control routine 1340 executed by the processor 1350 of each of the node devices 1300 may include a task component 1347 to cause the processor 1350 to receive and store a corresponding one of the task routines 1370. As also depicted, the control routine 1350 of each of the node devices 1300 may also include a page component 1341 to cause the processor to access the one or more partitions 1131 assigned for loading within the node device 1300, thereby causing one or more page-sized portions of each of the assigned partitions 1131 to be loaded into the volatile storage 1361 of the node device 1300 from the non-volatile storage 1363, thereof. The processor 1350 may be caused by the task component 1347 to perform the one or more operations specified in the task routine 1370 with the one or more assigned partitions 1131 being loaded into the volatile storage 1361.

As the processor 1350 performs such loading of the one or more assigned partitions 1131, and performs the one or more specified operations with the one or more assigned partitions 1131, the processor 1350 may be further caused by the monitor component 1342 to continue to transmit instances of the node status 1330 to continue to provide indications of the status of at least the volatile storage 1361 and/or the non-volatile storage 1363 to the coordinating device 1500. Additionally, the transmitted instances of the node status 1330 may also provide indications of progress in performing the one or more operations specified in the received one of the task routines 1370.

FIGS. 14A and 14B, taken together in order, illustrate an example embodiment of performance of a linear assignment analysis to generate an assignment for loading partitions of a single data cube within multiple node devices 1300. More specifically, FIGS. 14A-B depict an example triplet of node devices 1300x, 1300y and 1300z of a single data cube 1130 among which 1st and 2nd copies of a triplet of partitions 1131a, 1131b and 1131c were earlier distributed for storage. Thus, and turning to FIG. 14A, the non-volatile storage 1363x of the node device 1360x stores the 1st copy of partition 1131a and the 2nd copy of partition 1131c; the non-volatile storage 1363y of the node device 1360y stores the 1st copy of the partition 1131b; and the non-volatile storage 1363z of the node device 1360z stores the 1st copy of the partition 1131c, the 2nd copy of the partition 1131a and the 2nd copy of the partition 1131b.

It should be noted that this example based on just the three node devices 1300x-z, and involving just three partitions 1131a-c is a deliberately simplified example presented and discussed herein for purposes of explanation and understanding, and should not be taken as limiting. More specifically, it is envisioned that embodiments are likely to entail deriving assignments for the loading of considerably large quantities of partitions 1131 for each data cube 1130 among considerably larger quantities of node devices 1300.

With the partitions 1131a-c so stored, a request may have been received at the coordinating device 1500 for the performance of an operation with the partitions 1131a-c, thereby necessitating the loading of one copy of each of the partitions 1131a-c from the non-volatile storages 1363x-z and into some combination of the volatile storages 1361x-z. In response, the processor 1550 of the coordinating device 1500 may first check whether the quantity of available ones of the node devices 1300x-y is not less than the quantity of the partitions 1131a-c as part of determining whether to use a MILP analysis or a simpler linear assignment analysis. In so doing, the processor 1550 may be caused to check indications in instances of the node statuses 1330 transmitted to the coordinating device 1500 of which ones of the node devices 1300x-z are currently available. In some embodiments, the processor 1550 may also check whether the distribution of the copies of the partitions 1131a-c among the node devices 1300x-z provides at one-to-one distribution such that each one of the partitions 1131a-c is able to be assigned to be loaded within a separate one of the node devices 1300x-z.

With the node quantity and partition quantity both being 3 in this example, and with such a one-to-one distribution being in place in this example, the processor 1550 is able to select the use of a simpler linear assignment analysis. As a result, the cost to load each of the copies of each of the partitions 1131a-c from one of the non-volatile storages 1363x-z and into one of the corresponding volatile storages 1361x-z within the same node device 1360x-z, respectively, may all be assigned the same value, which may be the value of zero. In this way, there is no relative advantage or disadvantage to loading a one copy of one of the partitions 1131a-c within one of the node devices 1300x-z or loading a different copy of the same one of the partitions 1131a-c within another of the node devices 1300x-z. With these conditions in place, the processor 1550 may then perform a linear assignment analysis to derive an assignment for the loading of a single copy of each of the partitions 1131a-c within a separate one of the node devices 1300x-z.

FIG. 14B depicts the resulting assignment in which a single copy of each of the partitions 1131a-c is assigned to be loaded from non-volatile storage and into volatile storage within a separate one of the node devices 1300x-z. Specifically, partition 1131a is assigned to be loaded into volatile storage 1361x from non-volatile storage 1363x within node device 1300x; partition 1131b is assigned to be loaded into volatile storage 1361y from non-volatile storage 1363y within node device 1300y; and partition 1131c is assigned to be loaded into volatile storage 1361z from non-volatile storage 1363z within node device 1300z. Following the performance of this linear assignment analysis, the processor 1550 may transmit a corresponding one of multiple task routines 1370 to each of the node devices 1300x-z to cause the performances of the assignment.

FIGS. 15A, 15B and 15C, taken together in order, illustrate an example embodiment of performance of a two-pass MILP analysis to generate an assignment for loading partitions of a single data cube within multiple node devices 1300. More specifically, FIGS. 15A-C depict an example triplet of node devices 1300x, 1300y and 1300z among which 1st and 2nd copies of a quartet of partitions 1131a, 1131b, 1131c and 1131d were earlier distributed for storage. Thus, and turning to FIG. 15A, the non-volatile storage 1363x of the node device 1360x stores the 1st copy of partition 1131a, the 2nd copy of partition 1131c and the 1st copy of partition 1131d; the non-volatile storage 1363y of the node device 1360y stores the 1st copy of the partition 1131b and the 2nd copy of partition 1131d; and the non-volatile storage 1363z of the node device 1360z stores the 1st copy of the partition 1131c, the 2nd copy of the partition 1131a and the 2nd copy of the partition 1131b.

Like the example presented in FIGS. 14A-B, it should be noted that this example is a deliberately simplified example presented and discussed herein for purposes of explanation and understanding, and should not be taken as limiting.

With the partitions 1131a-d so stored, a request may have been received at the coordinating device 1500 for the performance of an operation with the partitions 1131a-d, thereby necessitating the loading of one copy of each of the partitions 1131a-d from the non-volatile storages 1363x-z and into some combination of the volatile storages 1361x-z. In response, the processor 1550 of the coordinating device 1500 may first check whether the quantity of available ones of the node devices 1300x-y is not less than the quantity of the partitions 1131a-d as part of determining whether to use a MILP analysis or a simpler linear assignment analysis. Again, the processor 1550 may be caused to check indications in instances of the node statuses 1330 transmitted to the coordinating device 1500 of which ones of the node devices 1300x-z are currently available.

With the node quantity being 3, which is less than the partition quantity of 4 in this example, the processor 1550 is not able to select the use of a simpler linear assignment analysis such that a two-pass MILP analysis may be used. As a result, the cost to load each of the copies of each of the partitions 1131a-c from one of the non-volatile storages 1363x-z and into one of the corresponding volatile storages 1361x-z within the same node device 1360x-z, respectively, may each be assigned a value based on a characteristic of the one of the partitions 1131a-c that would be loaded. In this example, the costs so assigned may be based on the size of each of the partitions 1131a-c. However, in other embodiments, other characteristics of each of the partitions 1131a-c may be used (e.g., quantity of data items and/or rows within each), or a characteristic of the volatile and/or non-volatile storages may be used (e.g., latency and/or another metric of performance of access).

In response to the fact that the node quantity of 3 is less than the partition quantity of 4 by a difference of 1, the processor 1550 may instantiate a single dummy node device 1301. As depicted, within the single dummy node device 1301, an additional copy of each of the partitions 1131a-d may have been fictionally stored within its fictional non-volatile storage 1363. In this way, the node quantity and partition quantity are now both 4, which may be needed to enable the use of a MILP analysis. For each of the additional copies of one of the partitions 1131a-d fictionally stored within the non-volatile storage 1363 of the dummy node device 1301, a cost to be loaded into the fictional volatile storage 1361 thereof may be set to a very high value that may be selected to be higher than the sum of all of the costs to load all of the real copies of the partitions 1131a-d put together. In this way, the assignment of any of the partitions 1131a-d to be loaded from the fictional non-volatile storage 1363 and into the fictional volatile storage 1361 within the dummy node device 1301 is made into a highly undesirable option from the standpoint of costs.

With these conditions in place, the processor 1550 may then perform the first pass of a MILP analysis to derive a first pass of assignment for the loading of a single copy of each of the partitions 1131a-d within a separate one of the node devices 1300x-z and the dummy node device 1301.

FIG. 15B depicts the resulting first pass assignment in which a single copy of each of the partitions 1131b-d is assigned to be loaded from non-volatile storage and into volatile storage within a separate one of the node devices 1300x-z, while the partition 1131a is assigned to be loaded from non-volatile storage and into volatile storage within the dummy node device 1301. Specifically, partition 1131c is assigned to be loaded into volatile storage 1361x from non-volatile storage 1363x within node device 1300x; partition 1131d is assigned to be loaded into volatile storage 1361y from non-volatile storage 1363y within node device 1300y; and partition 1131b is assigned to be loaded into volatile storage 1361z from non-volatile storage 1363z within node device 1300z. Thus, the assignments for the loading of partitions 1131b-d have been made in the first pass of MILP analysis.

However, the loading of partition 1131a is to the dummy node device 1301, which is an entirely fictional device. Thus, the processor 1550 may perform the second pass of MILP analysis to reassign the loading of partition 1131a from the fictional dummy device 1301. Based on the fact that real copies of the partition 1131a are stored in the non-volatile storages 1363x and 1363z of the node devices 1300x and 1300z, respectively, the processor 1550 may assign costs to the loading of each of these two copies of the partition 1131a that are based on a combination of a characteristic of the partition 1131a and the same characteristic of whichever partition has already been assigned to be loaded within each of the node devices 1300x and 1300z in the first pass assignment. Thus, in this example, where the partition 1131c was assigned to be loaded within the node device 1300x and where the partition 1131b was assigned to be loaded within the node device 1300z in the first pass assignment, the processor 1550 may set the cost for loading the copy of the partition 1131a stored within the node device 1300x to be a sum of the sizes of the partitions 1131a and 1131c, and may set the cost for loading the copy of the partition 1131a stored within the node device 1300z to be a sum of the size of the partitions 1131a and 1131b.

The processor 1550 may then perform the second pass MILP analysis. Since the purpose of the second pass MILP analysis is to reassign the loading of the partition 1131a from the dummy node device 1301 and to one of the real node devices 1300x or 1300z in which real copies of the partition 1131a are loaded, the second pass MILP analysis may be limited to the partition 1131a and the pair of real node devices 1300x and 1300z.

FIG. 15C depicts the addition of the resulting second pass assignment to the earlier generated first pass assignment to generate the combined assignment for the loading of the partitions 1131a-d within the node devices 1300x-z. More specifically, the resulting second pass assignment of the loading of a single copy of the partition 1131a within the node device 1300x has been added to the earlier described first pass assignments for the loading of a single copy of each of the partitions 1131b-d. Thus, with the performance of the second pass MILP analysis, a single copy of each of the partitions 1131a-d has been assigned to be performed within one of the node devices 1300x-z. Following the performance of this two-pass MILP analysis, the processor 1550 may transmit a corresponding one of multiple task routines 1370 to each of the node devices 1300x-z to cause the performances of the assignment.

Figure 16A:
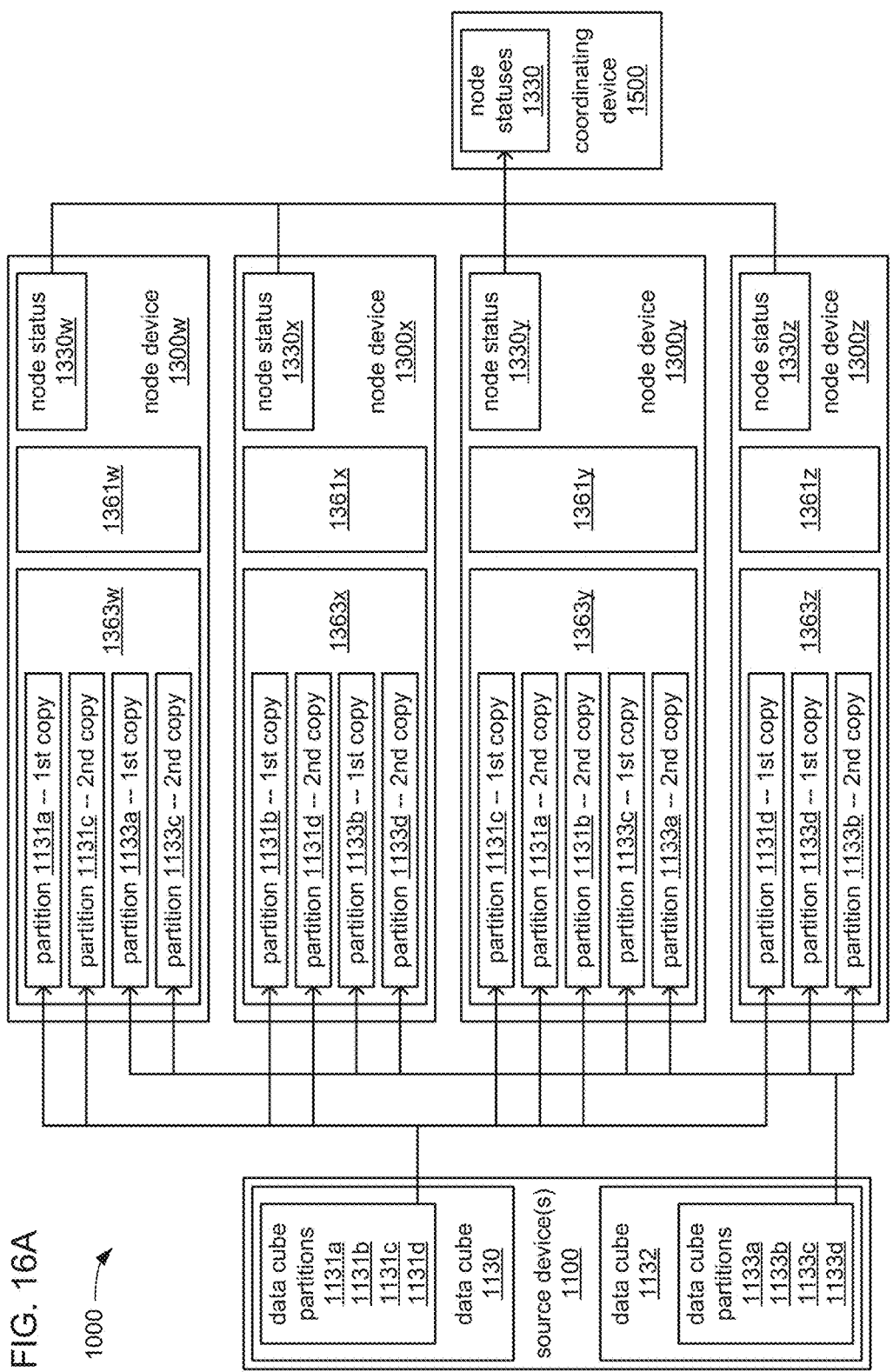
FIGS. 16A, 16B and 16C, together, illustrate an example of use of a two-pass MILP analysis to derive an assignment for loading partitions of a pair of data cubes within multiple node devices.
Figure 16B:
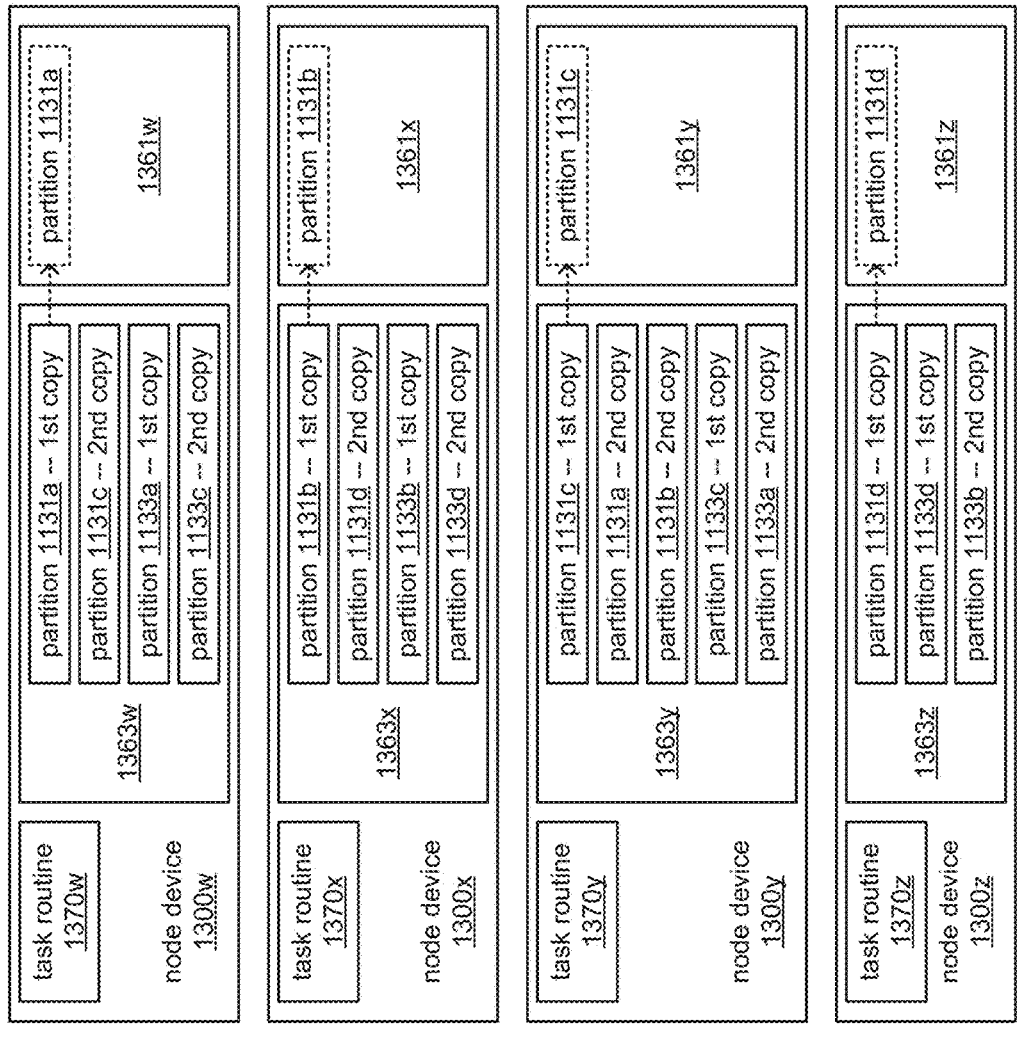
Figure 16C:
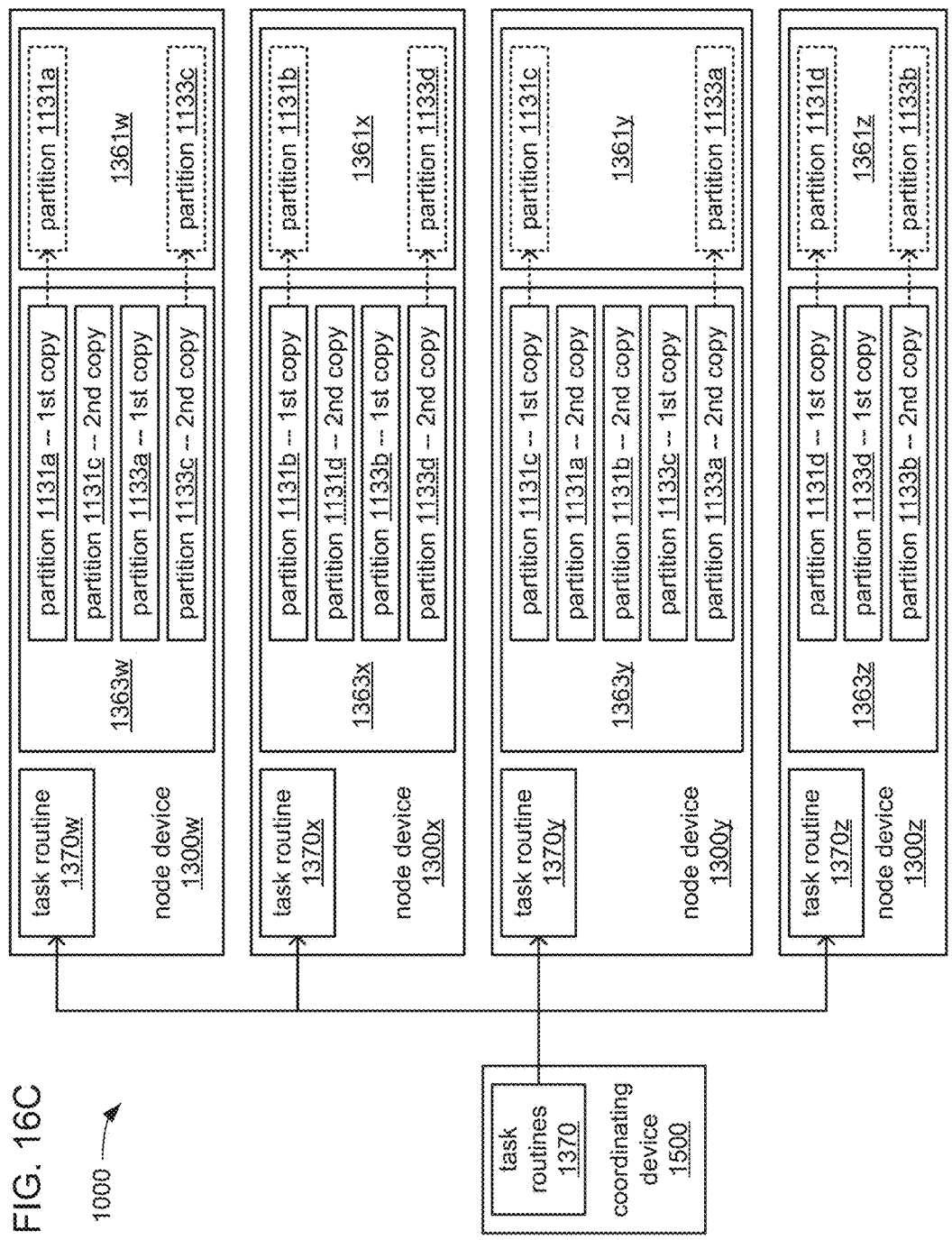

FIGS. 16A, 16B and 16C, taken together in order, illustrate an example embodiment of performance of a combination of linear assignment and MILP analyses, one in a first pass and the other in a second pass, to generate an assignment for loading partitions of a pair of data cubes within multiple node devices 1300. More specifically, FIGS. 16A-C depict an example quartet of node devices 1300w, 1300x, 1300y and 1300z among which 1st and 2nd copies of a quartet of partitions 1131a, 1131b, 1131c and 1131d of a data cube 1130, and 1st and 2nd copies of another quartet of partitions 1133a, 1133b, 1133c and 1133d of another data cube 1132 were earlier distributed for storage. Thus, and turning to FIG. 16A, the non-volatile storage 1363w of the node device 1360w stores the 1st copy of partition 1131a, the 2nd copy of partition 1131c, the 1st copy of partition 1133a and the 2nd copy of partition 1133c; the non-volatile storage 1363x of the node device 1360x stores the 1st copy of partition 1131b, the 2nd copy of partition 1131d, the 1st copy of partition 1133b and the 2nd copy of partition 1133d; the non-volatile storage 1363y of the node device 1360y stores the 1st copy of the partition 1131c, the 2nd copy of the partition 1131a, the 2nd copy of the partition 1131b, the 1st copy of the partition 1133c and the 2nd copy of partition 1133a; and the non-volatile storage 1363z of the node device 1360z stores the 1st copy of the partition 1131d, the 1st copy of the partition 1133d and the 2nd copy of the partition 1133b.

Like the examples presented in FIGS. 14A-B and in FIGS. 15A-C, it should be noted that this example is a deliberately simplified example presented and discussed herein for purposes of explanation and understanding, and should not be taken as limiting.

With the partitions 1131a-d and 1133a-d so stored, a request may have been received at the coordinating device 1500 for the performance of an operation with the partitions 1131a-d and 1133a-d, thereby necessitating the loading of one copy of each of the partitions 1131a-d and of one copy of each of the partitions 1133a-d from the non-volatile storages 1363w-z and into some combination of the volatile storages 1361w-z. In response, the processor 1550 of the coordinating device 1500 may first check whether the quantity of available ones of the node devices 1300w-y is not less than the quantity of either of the partitions 1131a-d or 1133a-d as part of determining whether to use a MILP analysis or a simpler linear assignment analysis may be used in assigning one or the other of these two sets of partitions. Again, the processor 1550 may be caused to check indications in instances of the node statuses 1330 transmitted to the coordinating device 1500 of which ones of the node devices 1300x-z are currently available.

With the node quantity and partition quantities for both sets of partitions all being 4 in this example, the processor 1550 is able to select the use of a simpler linear assignment analysis in assigning either one or the other of these two sets of partitions for loading within the node devices 1300w-z in a first pass. In this example, it is the set of partitions 1131a-d that are selected to be so assigned using a linear assignment analysis in the first pass.

As a result, the cost to load each of the copies of each of the partitions 1131a-d from one of the non-volatile storages 1363w-z and into one of the corresponding volatile storages 1361w-z within the same node device 1360w-z, respectively, may all be assigned the same value, which may be the value of zero. Again, in this way, there is no relative advantage or disadvantage to loading a one copy of one of the partitions 1131a-d within one of the node devices 1300w-z or loading a different copy of the same one of the partitions 1131a-d within another of the node devices 1300w-z. With these conditions in place, the processor 1550 may then perform a linear assignment analysis as a first pass to derive an assignment for the loading of a single copy of each of the partitions 1131a-d within a separate one of the node devices 1300w-z.

FIG. 16B depicts the resulting first pass assignment in which a single copy of each of the partitions 1131a-d is assigned to be loaded from non-volatile storage and into volatile storage within a separate one of the node devices 1300w-z. Specifically, partition 1131a is assigned to be loaded into volatile storage 1361w from non-volatile storage 1363w within node device 1300w; partition 1131b is assigned to be loaded into volatile storage 1361x from non-volatile storage 1363x within node device 1300x; partition 1131c is assigned to be loaded into volatile storage 1361y from non-volatile storage 1363y within node device 1300y; and partition 1131d is assigned to be loaded into volatile storage 1361z from non-volatile storage 1363z within node device 1300z.

With the first pass assignment so generated, each of the node devices 1300w-z is now assigned to have one of the partitions 1131a-d loaded into a corresponding one of the volatile storages 1361w-z thereof. As a result, a MILP analysis may need to be employed to generate the second pass assignment for the loading of the partitions 1133a-d in order to take into account both the costs of the loadings of the partitions 1131a-d of the data cube 1130 and the costs of the loadings of the partitions 1133a-d of the data cube 1132.

Thus, the processor 1550 may assign costs to the loading of each copy of each of the partitions 1133a-d that are based on a combination of a characteristic of one of the partitions 1133a-d and the same characteristic of whichever one of the partitions 1131a-d has already been assigned to be loaded within each of the node devices 1300w-z in the first pass assignment. Thus, in this example, where the partition 1131a was assigned in the first pass assignment to be loaded within the node device 1300w, the processor 1550 may set the cost for loading the copy of the partition 1133a stored within the node device 1300w to be a sum of the sizes of the partitions 1131a and 1133a, and may set the cost for loading the copy of the partition 1133c stored within the node device 1300w to be a sum of the size of the partitions 1131a and 1133w. Similar summations of sizes may be assigned as costs for the loading of the copies of each of the partitions 1133a-d stored within each of the other node devices 1300x-z. With these conditions in place, the processor 1550 may then perform the second pass MILP analysis.

FIG. 16C depicts the addition of the resulting second pass assignment to the earlier generated first pass assignment to generate the combined assignment for the loading of the partitions 1131a-d and of the partitions 1133a-d within the node devices 1300w-z. More specifically, added to the first pass assignment is the resulting second pass assignment of the loading of the partition 1133c within the node device 1300w, the loading of the partition 1133d within the node device 1300x, the loading of the partition 1133a within the node device 1330y, and the loading of the partition 1133b within the node device 1330*z*. Thus, with the performance of the second pass MILP analysis, a single copy of each of the partitions 1131*a-d* and a single copy of each of the partitions 1133 *a-d* has been assigned to be performed within each of the node devices 1300*w-z*. Following the performance of this two-pass combination of linear assignment and MILP analyses, the processor 1550 may transmit a corresponding one of multiple task routines 1370 to each of the node devices 1300*w-z* to cause the performances of the assignment.

Figure 17:
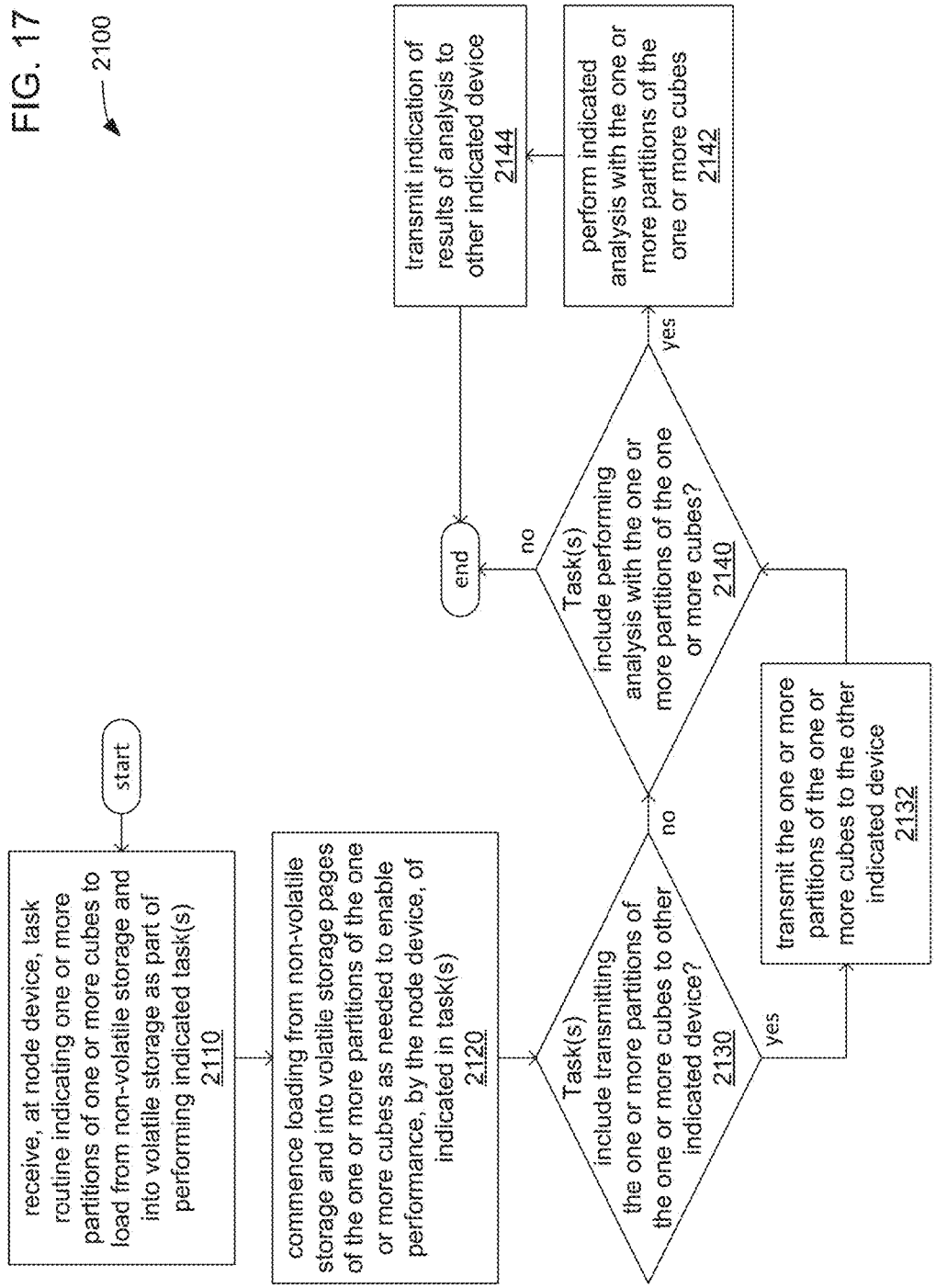
FIG. 17 illustrates an example embodiment of a logic flow of loading and performing one or more operations on a partition of a data cube.
Figure 18A:
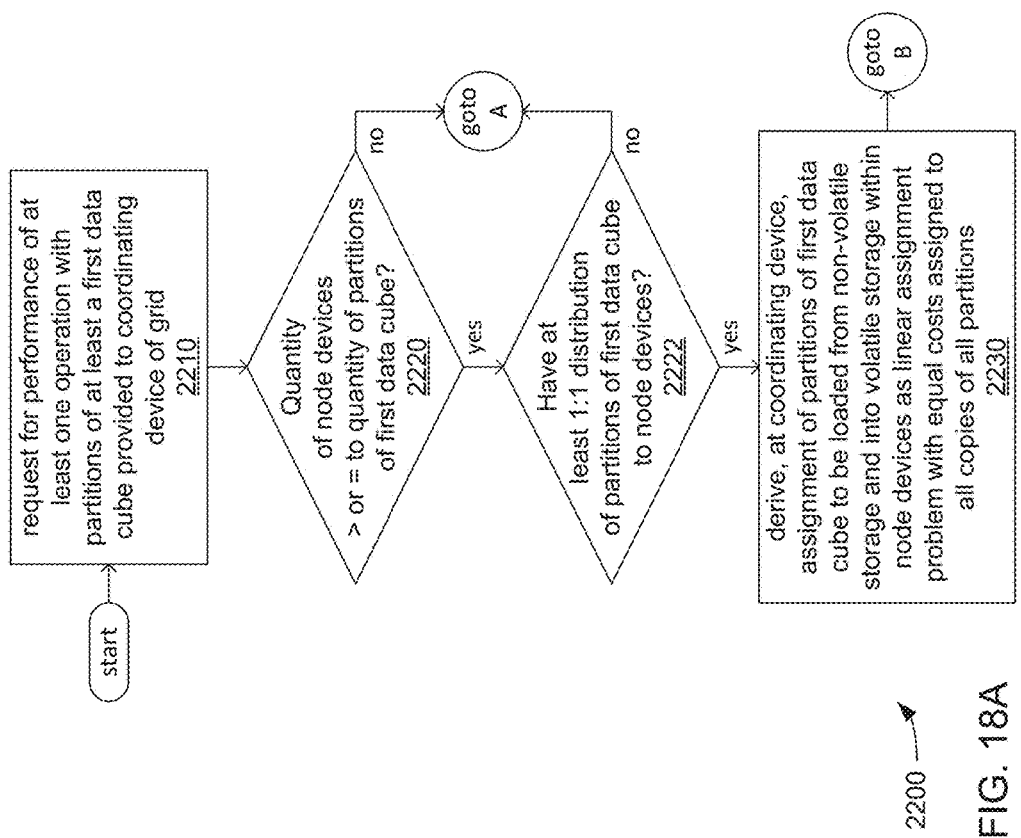
FIGS. 18A, 18B, 18C and 18D, together, illustrate an example embodiment of a logic flow of generating an assignment for the loading of partitions of a data cube.
Figure 18B:
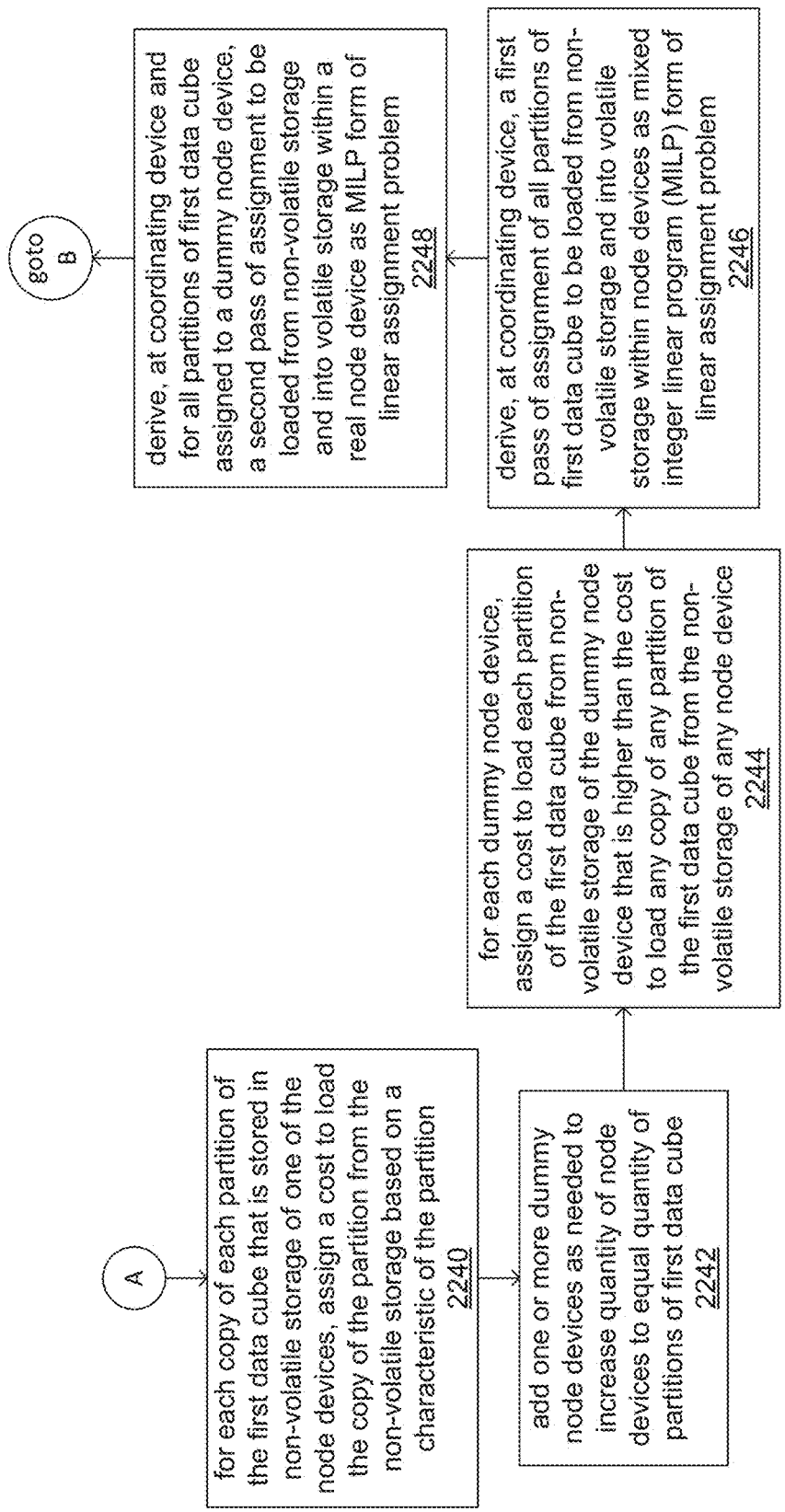
Figure 18C:
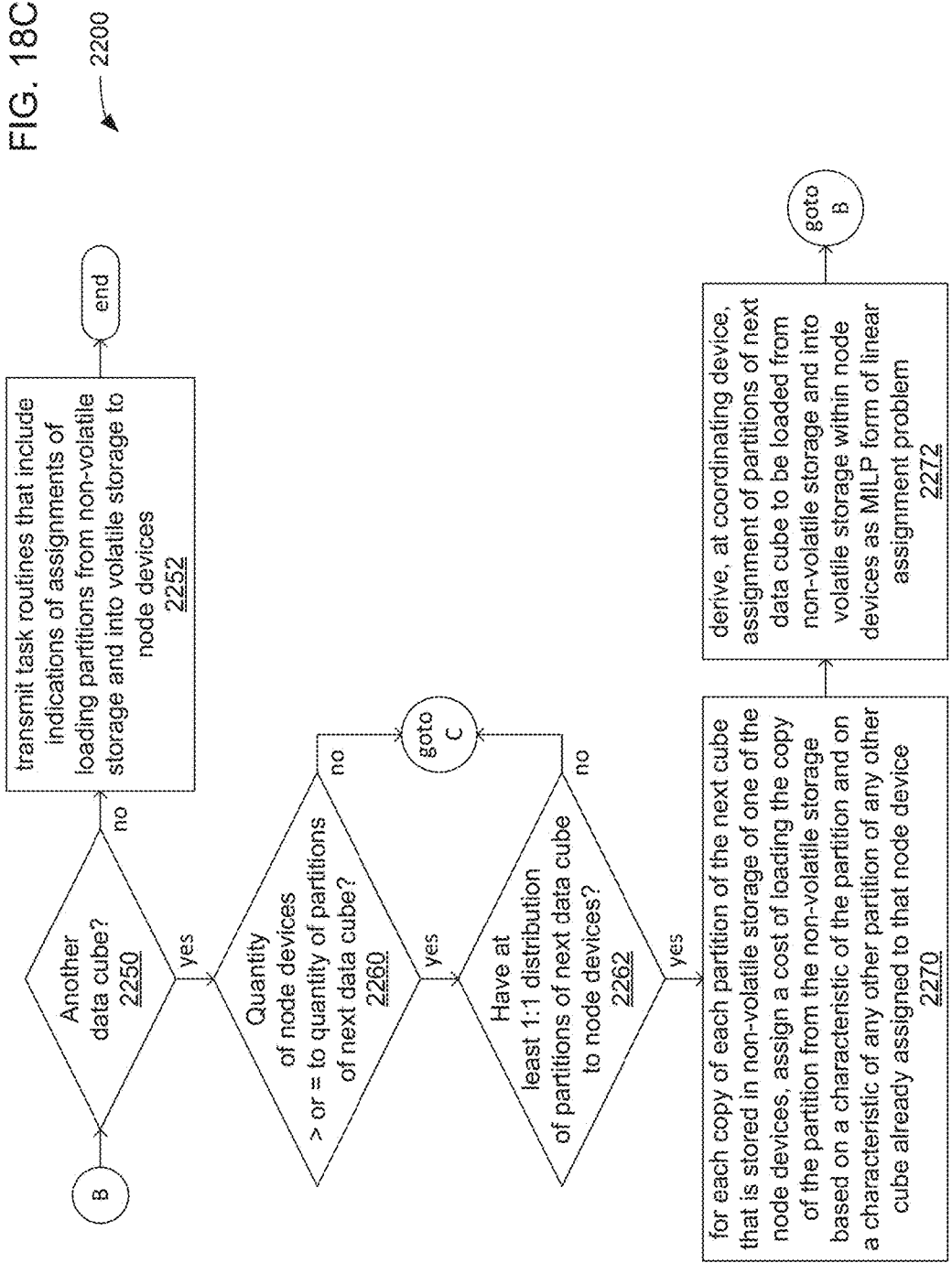
Figure 18D:
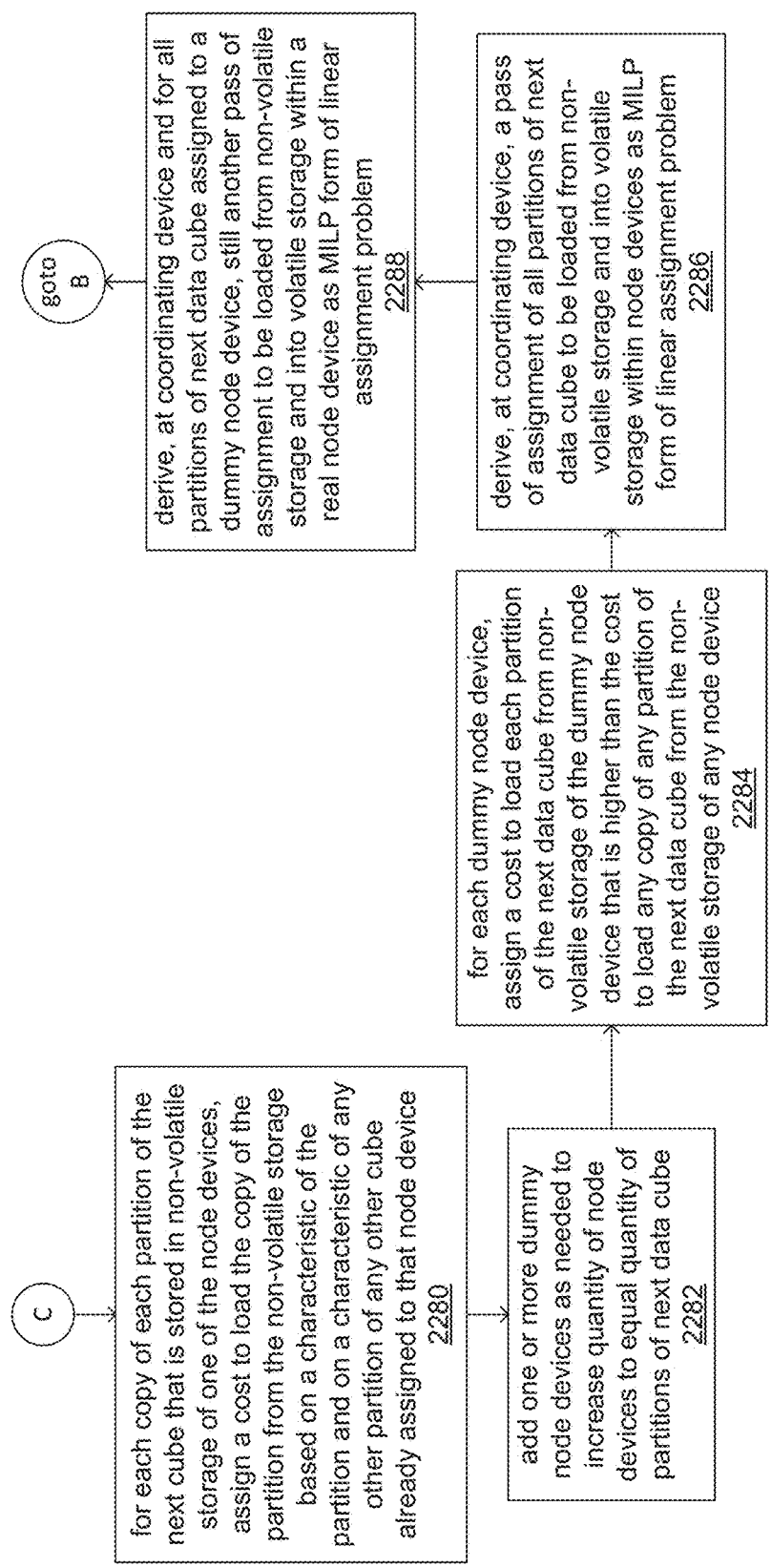

FIG. 17 illustrates an example embodiment of a logic flow 2100. The logic flow 2100 may be representative of some or all of the operations executed by one or more embodiments described herein. More specifically, the logic flow 2100 may illustrate operations performed by the processor 1350, and/or performed by other component(s) of each of the multiple node devices 1300 in executing the control routine 1340 to effect the loading and performance of one or more operations with a partition of a data cube.

At 2110, a processor of a node device of a grid of node devices of a distributed processing system (e.g., the processor 1350 of one of the node devices 1300 of the node device grid 1003 of the distributed processing system 1000) may receive a task routine transmitted to the node device a coordinating device of the distributed processing system (e.g., the coordinating device 1500). The task routine may include an indication of one or more partitions of one or more data cubes that may be stored within non-volatile storage of the node device (e.g., the non-volatile storage 1563) that have been assigned by the coordinating device to be loaded from the non-volatile storage and into the volatile storage of the node device (e.g., the volatile storage 1561). The task routine may also include instructions executable by the processor and/or another form of indication of one or more operations that are to be performed with the one or more partitions specified in the task routine.

At 2120, the processor may commence the loading of page-sized portions of each of the one or more specified partitions from the non-volatile storage and into the volatile storage. As previously discussed, such loading of page-sized portions of such partitions may occur in response to the processor making accesses to such partitions as part of performing the one or more tasks specified to be performed with such partitions.

If, at 2130, the one or more specified tasks includes transmitting the one or more specified partitions of the one or more data cubes to another device indicated in the task routine, then at 2132, the processor may so transmit the one or more specified partitions.

Then, at 2140, if the one or more specified tasks includes performing an analysis with the one or more specified partitions of the one or more data cubes, then at 2142, the processor may perform the specified analysis with the one or more partitions before transmitting an indication of the results of that analysis (e.g., at least a portion of the results data 1830) to a device indicated in the task routine at 2144.

FIGS. 18A, 18B, 18C and 18D, together, illustrate an example embodiment of a logic flow 2200. The logic flow 2200 may be representative of some or all of the operations executed by one or more embodiments described herein. More specifically, the logic flow 2200 may illustrate operations performed by the processor 1550 and/or 1650, and/or performed by other component(s) of the coordinating device 1500 and/or the one or more assignment devices 1600, respectively, in executing the control routine 1540 and/or the one or more sub-problem routines 1670 to derive an assignment for the loading of the partitions 1131 of one or more data cubes 1130 within multiple node devices 1300.

At 2210, a processor of a coordinating device of a distributed processing system (e.g., the processor 1550 of the coordinating device 1500 of the distributed processing system 1000), or a processor of one of multiple node devices of a node device grid of the distributed processing system (e.g., the processor 1350 of one of the multiple node devices 1300 of the node device grid 1003) serving as a coordinating device, may receive a request for the performance of one or more operations with the partitions of at least a first data cube (e.g., the partitions 1131 of one of the data cubes 1130). As previously discussed, such a request may be received from another device via a network (e.g., the viewing device 1800 via the network 1999), from an input device more directly associated with the coordinating device (e.g., the input device 1520), and/or from a routine executed within the coordinating device (e.g., one of the analysis routines 1170).

At 2220, the processor may check whether the quantity of node devices that are currently available and that have stored within non-volatile storage thereof (e.g., the non-volatile storage 1363 of each of the node devices 1300) a copy of at least one of the partitions of the first data cube is greater than or equal to (i.e., not less than) the quantity of the partitions of the first data cube. If not (i.e., if the node quantity is less than the partition quantity), then the processor may perform a MILP analysis to generate an assignment for the loading of the partitions of the first data cube starting at 2240. However, if so (i.e., if the node quantity is greater than or equal to the partition quantity), then the processor may additionally check, at 2222, whether there is a one-to-one distribution of at least one copy of the partitions of the first data cube among the node devices such that each partition could be assigned to be loaded within a separate one of the node devices. If not, then the processor may perform the MILP analysis starting at 2240. However, if so, then the processor may perform a simpler linear assignment analysis to generate a first pass assignment for the loading of the partitions of the first data cube at 2230, in which the cost ascribed by the processor for the loading of every copy of every one of the partitions is set to be equal, and may be set to the value of zero.

Turning to the performance of the MILP analysis starting at 2240, the processor may, for each copy of each partition of the first data cube that is stored within the non-volatile storage of one of the node devices, assign a cost to load that copy within that node device that is based on a characteristic of the partition. As has been discussed, such a cost may be based on the size of the partition. However, as has also been discussed, the costs may, instead, be based on a characteristic of the volatile and/or non-volatile storages of that node device (e.g., latency and/or another measure of speed of access thereof, etc.).

At 2242, the processor may add one or more dummy node devices as needed to increase the total quantity of node devices to equal the quantity of partitions of the first data cube. As has been discussed, the processor may treat each of the dummy node devices as storing a copy of each of the partitions of the first data cube. In so doing, for each of the dummy node devices that are added, the processor may assign a cost to load each of the partitions of the first data cube within that dummy node device that is selected to be higher than the cost to load any copy of any of the partitions of the first data cube within any of the real node devices at 2244.

At 2246, the processor may perform the first pass MILP analysis to derive a first pass assignment for loading the partitions of the first data cube from non-volatile storage and into volatile storage within a combination of the real node devices and the one or more dummy node devices that have been added. At 2248, the processor may then perform a second pass MILP analysis involving just the one or more partitions of the first data cube that were assigned to a dummy node device in the first pass and involving just the real node devices to derive a second pass assignment. As previously discussed, such a second pass assignment reassigns, to one of the real node devices, each of the one or more partitions of the first data cube that were assigned to a dummy node device.

Following either the performance of the MILP analysis starting at 2240 or the performance of the simpler linear analysis at 2230, the processor may check, at 2250, whether the request is for the one or more operations to be performed with any additional data cubes beyond the first data cube. If not, then at 2252, the processor may transmit, to each of the node devices to which the loading of at least one partition has been assigned, a task routine that includes an indication of which partitions have been assigned to be loaded from non-volatile storage and into volatile storage within that node device.

However, if at 2252, the request is to perform the one or more operations with such an additional data cube, then at 2260, the processor may check whether the quantity of node devices that are currently available and that have stored within non-volatile storage thereof a copy of at least one of the partitions of the next data cube is greater than or equal to (i.e., not less than) the quantity of the partitions of the next data cube. If not (i.e., if the node quantity is less than the partition quantity), then the processor may perform a MILP analysis to generate an assignment for the loading of the partitions of the next data cube starting at 2280. However, if so (i.e., if the node quantity is greater than or equal to the partition quantity), then the processor may additionally check, at 2262, whether there is a one-to-one distribution of at least one copy of the partitions of the next data cube among the node devices such that each partition could be assigned to be loaded within a separate one of the node devices. If not, then the processor may perform the MILP analysis starting at 2280. However, if so, then the processor may perform a simpler linear assignment analysis to generate an assignment for the loading of the partitions of the next data cube at 2270, in which the cost ascribed by the processor for the loading of every copy of every one of the partitions is set to be equal, and may be set to the value of zero.

Turning to the performance of the MILP analysis starting at 2280, the processor may, for each copy of each partition of the next data cube that is stored within the non-volatile storage of one of the node devices, assign a cost to load that copy within that node device that is based on a characteristic of the partition and on the same characteristic of any other partition of any other data cube (including of the first data cube) that is already assigned to be loaded within the same node device. Thus, as has been discussed, such a cost may be a sum of the costs of loading more than one partition within the same node device.

At 2282, the processor may add one or more dummy node devices as needed to increase the total quantity of node devices to equal the quantity of partitions of the next data cube. Again, the processor may treat each of the dummy node devices as storing a copy of each of the partitions of the next data cube. In so doing, for each of the dummy node devices that are added, the processor may assign a cost to load each of the partitions of the next data cube within that dummy node device that is selected to be higher than the cost to load any copy of any of the partitions of the next data cube within any of the real node devices at 2844.

At 2286, the processor may perform another pass of MILP analysis to derive an assignment for loading the partitions of the next data cube from non-volatile storage and into volatile storage within a combination of the real node devices and the one or more dummy node devices that have been added. At 2248, the processor may then perform a still another pass of MILP analysis involving just the one or more partitions of the next data cube that were assigned to a dummy node device and involving just the real node devices to derive still another pass of assignment. As previously discussed, such another pass of assignment reassigns, to one of the real node devices, each of the one or more partitions of the next data cube that were assigned to a dummy node device.

Following either the performance of the MILP analysis starting at 2280 or the performance of the simpler linear analysis at 2270, the processor may check again, at 2250, whether the request involves still another data cube beyond the first data cube and any additional data cubes for which assignments for the loading of partitions have been generated. If not, then at 2252, the processor may transmit, to each of the node devices to which the loading of at least one partition has been assigned, a task routine that includes an indication of which partitions of which data cubes have been assigned to be loaded from non-volatile storage and into volatile storage within that node device.

In various embodiments, each of the processors 1350, 1550, 1650 and 1850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked. However, in a specific embodiment, the processor 1550 of the coordinating device 1500 may be selected to efficiently perform MILP analyses to generate assignments for the loading of partitions. Alternatively or additionally, the processor 1350 of each of the node devices 1300 may be selected to efficiently perform an analysis with a partition 1131 at least partially in parallel with the processors 1350 of others of the node devices 1300. By way of example, the processor 1350 and/or 1550 may incorporate a single-instruction multiple-data (SIMD) architecture, may incorporate multiple processing pipelines, and/or may incorporate the ability to support multiple simultaneous threads of execution per processing pipeline.

In various embodiments, each of the routines 1170, 1340, 1370, 1540 and 1670, including the components of which each is composed, may be selected to be operative on whatever type of processor or processors that are selected to implement applicable ones of the processors 1350, 1550, 1650 and/or 1850 within corresponding ones of the devices 1300, 1500, 1600 and/or 1800. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1350, 1350, 1650 and/or 1850. Where one or more device drivers are included, those device drivers may provide support for any of a variety of other components, whether hardware or software components, of the devices 1300, 1500, 1600 and/or 1800.

In various embodiments, each of the storages 1360, 1560 and 1860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1360 of one or more of the node devices 1300 that stores one or more of the partitions 1131 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 1520 and 1820 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1580 and 1880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 1580 of the coordinating device 1500 and/or the display 1880 of the viewing device 1800 may be a touchscreen display such that the input device 1520 may be incorporated into the display 1580 and/or the input device 1820 may be incorporated into the display 1880. In such embodiments, the input device 1520 and/or the input device 1820 may be a touch-sensitive component of the display 1580 and/or the display 1880, respectively.

In various embodiments, the network interfaces 1390, 1590 and 1890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1390 of one or more of the node devices 1300 that stores one or more of the partitions 1131 may be implemented with multiple copper-based or fiber-optic based network interface ports to provide redundant and/or parallel pathways in exchanging one or more of the partitions 1131 with the one or more storage devices 1100.

In various embodiments, the division and/or use of processing and/or storage resources among the coordinating device 1500 and/or the node devices 1300, and/or the API architectures supporting communications among the coordinating device 1500 and/or the node devices 1300, may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of the partitions 1131 of a selected data cube 1130 are not dependent on, nor constrained by, existing API architectures and/or supporting communications protocols. More broadly, there is nothing in the manner in which the selected data cube 1130 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
  receive node status from a plurality of node devices of a node device grid, wherein the node status comprises an indication of status of storage of each node device of the plurality of node devices;
  receive a request to perform an operation with a first data cube, wherein:
    the first data cube comprises a plurality of partitions; and
    at least one copy of the partitions of the first data cube are distributed among the plurality of node devices such that non-volatile storage of each node device stores a copy of at least one partition of the first data cube;
  compare quantities of the node devices of the plurality of node devices and of the partitions of the first data cube to determine whether the quantity of node devices of the plurality of node devices is less than the quantity of partitions of the first data cube;
  in response to a determination that the quantity of node devices of the plurality of node devices is less than the quantity of partitions of the first data cube:
    for each copy of each partition of the first data cube stored within the non-volatile storage of a node device of the plurality of node devices, assign a cost to load the copy of the partition from the non-volatile storage of the node device based at least on a size of the partition;
    add, to the quantity of node devices of the plurality of node devices, a first quantity of dummy node devices to cause a sum of the quantity of node devices of the plurality of node devices and the first quantity of dummy node devices to at least equal the quantity of partitions of the first data cube;
    for each dummy node device of the first quantity of dummy node devices, assign a cost to load each partition of the first data cube from a non-volatile storage of the dummy node device that is greater than any of the costs to load any partition of the first data cube stored in the non-volatile storage of any of the node devices of the plurality of node devices;
    use mixed integer linear programming (MILP), derive a first pass of assignment of a single copy of each partition of the first data cube to be loaded from the non-volatile storage of either a node device of the plurality of node devices or a dummy node device of the first quantity of dummy node devices; and
    transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

2. The apparatus of claim 1, wherein, in response to a determination that the quantity of node devices of the plurality of node devices is less than the quantity of partitions of the first data cube, the processor is caused to perform operations comprising:
  for each copy of a partition of the first data cube assigned to be loaded from the non-volatile storage of a dummy node device of the first quantity of dummy node devices, use MILP to derive a second pass of assignment of the copy of the partition of the first data cube to be loaded from the non-volatile storage of a node device of the plurality of node devices;
  augment at least one task routine with an indication as the assignment of a single copy of a partition of the first data cube to be loaded from the non-volatile storage of, and into the volatile storage of, a node device of the plurality of node devices based on the second pass of assignment;
  analyze the distribution of the partitions of the first data cube among the plurality of node devices to determine whether there is at least a one-to-one distribution of at least one copy of the partitions of the first data cube among the plurality of node devices; and
  condition the transmission of the task routines to the plurality of node devices on a determination that there is not at least a one-to-one distribution of at least one copy of the partitions of the first data cube among the plurality of node devices.

3. The apparatus of claim 1, wherein the processor, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, is caused to perform operations comprising:
  for each copy of each partition of the first data cube stored within the non-volatile storage of a node device of the plurality of node devices, assign a single identical cost to load the copy of the partition from the non-volatile storage of the node device;
  derive, as a linear assignment problem, the first pass of assignment of a single copy of each partition of the first data cube to be loaded from the non-volatile storage of a node device of the plurality of node devices; and
  transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

4. The apparatus of claim 1, wherein:
  the requested operation is to be performed with a second data cube in addition to the first data cube;
  the second data cube comprises a plurality of partitions;
  the partitions of the second data cube are distributed among the plurality of node devices such that non-volatile storage of each node device stores a copy of at least one partition of the second data cube; and
  the processor is caused to perform operations comprising:

compare quantities of the node devices of the plurality of node devices and of the partitions of the second data cube to determine whether the quantity of node devices of the plurality of node devices is less than the quantity of partitions of the second data cube; and analyze the distribution of the partitions of the second data cube among the plurality of node devices to determine whether there is at least a one-to-one distribution of at least one copy of the partitions of the second data cube among the plurality of node devices.

5. The apparatus of claim 4, wherein the processor, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, is caused to perform operations comprising:

for each copy of each partition of the second data cube stored within the non-volatile storage of a node device of the plurality of node devices, assign a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device;

add, to the quantity of node devices of the plurality of node devices, a second quantity of dummy node devices to cause a sum of the quantity of node devices of the plurality of node devices and the second quantity of dummy node devices to at least equal the quantity of partitions of the second data cube;

for each dummy node device of the second quantity of dummy node devices, assign a cost to load each partition of the second data cube from a non-volatile storage of the dummy node device that is greater than any of the costs to load any partition of the second data cube stored in the non-volatile storage of any of the node devices of the plurality of node devices;

use MILP to derive a third pass of assignment of a single copy of each partition of the second data cube to be loaded from the non-volatile storage of either a node device of the plurality of node devices or a dummy node device of the second quantity of dummy node devices;

for each copy of a partition of the second data cube assigned to be loaded from the non-volatile storage of a dummy node device of the second quantity of dummy node devices, use MILP to derive a fourth pass of assignment of the copy of the partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on a combination of the third and fourth passes of assignment.

6. The apparatus of claim 4, wherein the processor, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, is caused to perform operations comprising:

for each copy of each partition of the second data cube stored within the non-volatile storage of a node device of the plurality of node devices, assign a cost to read the copy of the partition of the second data cube from the non-volatile storage of the node device based at least on a characteristic of any partition of the first data cube assigned in the first pass to be loaded from the non-volatile storage of the node device;

use MILP to derive a third pass of assignment of a single copy of each partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on the third pass of assignment.

7. The apparatus of claim 1, wherein:
the apparatus comprises a node device of the plurality of node devices; and
the processor is caused to execute a task routine, at least partially in parallel with the execution of one of the task routines by a processor of another node device of the plurality of node devices, to perform the requested operation at least partially in parallel with the processor of the other node device.

8. The apparatus of claim 1, wherein the processor is caused to transmit instructions to the plurality of node devices to receive the plurality of partitions of the first data cube from at least one storage device for storage within the non-volatile storages of the plurality of node devices.

9. The apparatus of claim 1, wherein:
the status of storage of each node device of the plurality of node devices is selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device; and
the size of each partition of the first data cube is selected from a group consisting of the quantity of storage space currently occupied by the partition, and a quantity of entries of the partition.

10. The apparatus of claim 1, wherein the operation is selected from a group consisting of a join of the first data cube with one or more other data cubes, a retrieval of the first data cube to transmit at least a subset of the first data cube to another device, and an analysis of at least a subset of the first data cube.

11. A computer-program product tangibly embodied in a non-transitory machine-readable storage medium, the computer-program product including instructions operable to cause a processor to perform operations comprising:

receive node status from a plurality of node devices of a node device grid, wherein the node status comprises an indication of status of storage of each node device of the plurality of node devices;

receive a request to perform an operation with a first data cube, wherein:

the first data cube comprises a plurality of partitions; and at least one copy of the partitions of the first data cube are distributed among the plurality of node devices such that non-volatile storage of each node device stores a copy of at least one partition of the first data cube;

compare quantities of the node devices of the plurality of node devices and of the partitions of the first data cube to determine whether the quantity of node devices of the plurality of node devices is less than the quantity of partitions of the first data cube;

in response to a determination that the quantity of node devices of the plurality of node devices is less than the quantity of partitions of the first data cube:

for each copy of each partition of the first data cube stored within the non-volatile storage of a node device of the plurality of node devices, assign a cost to load the copy of the partition from the non-volatile storage of the node device based at least on a size of the partition;

add, to the quantity of node devices of the plurality of node devices, a first quantity of dummy node devices to cause a sum of the quantity of node devices of the plurality of node devices and the first quantity of dummy node devices to at least equal the quantity of partitions of the first data cube;

for each dummy node device of the first quantity of dummy node devices, assign a cost to load each partition of the first data cube from a non-volatile storage of the dummy node device that is greater than any of the costs to load any partition of the first data cube stored in the non-volatile storage of any of the node devices of the plurality of node devices;

use mixed integer linear programming (MILP), derive a first pass of assignment of a single copy of each partition of the first data cube to be loaded from the non-volatile storage of either a node device of the plurality of node devices or a dummy node device of the first quantity of dummy node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

12. The computer-program product of claim 11, wherein, in response to a determination that the quantity of node devices of the plurality of node devices is less than the quantity of partitions of the first data cube, the processor is caused to perform operations comprising:

for each copy of a partition of the first data cube assigned to be loaded from the non-volatile storage of a dummy node device of the first quantity of dummy node devices, use MILP to derive a second pass of assignment of the copy of the partition of the first data cube to be loaded from the non-volatile storage of a node device of the plurality of node devices;

augment at least one task routine with an indication as the assignment of a single copy of a partition of the first data cube to be loaded from the non-volatile storage of, and into the volatile storage of, a node device of the plurality of node devices based on the second pass of assignment;

analyze the distribution of the partitions of the first data cube among the plurality of node devices to determine whether there is at least a one-to-one distribution of at least one copy of the partitions of the first data cube among the plurality of node devices; and condition the transmission of the task routines to the plurality of node devices on a determination that there is not at least a one-to-one distribution of at least one copy of the partitions of the first data cube among the plurality of node devices.

13. The computer-program product of claim 11, wherein the processor, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, is caused to perform operations comprising:

for each copy of each partition of the first data cube stored within the non-volatile storage of a node device of the plurality of node devices, assign a single identical cost to load the copy of the partition from the non-volatile storage of the node device;

derive, as a linear assignment problem, the first pass of assignment of a single copy of each partition of the first data cube to be loaded from the non-volatile storage of a node device of the plurality of node devices; and transmit, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

14. The computer-program product of claim 11, wherein:

the requested operation is to be performed with a second data cube in addition to the first data cube;

the second data cube comprises a plurality of partitions;

the partitions of the second data cube are distributed among the plurality of node devices such that non-volatile storage of each node device stores a copy of at least one partition of the second data cube; and the processor is caused to perform operations comprising:

compare quantities of the node devices of the plurality of node devices and of the partitions of the second data cube to determine whether the quantity of node devices of the plurality of node devices is less than the quantity of partitions of the second data cube; and analyze the distribution of the partitions of the second data cube among the plurality of node devices to determine whether there is at least a one-to-one distribution of at least one copy of the partitions of the second data cube among the plurality of node devices.

15. The computer-program product of claim 14, wherein the processor, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, is caused to perform operations comprising:

for each copy of each partition of the second data cube stored within the non-volatile storage of a node device of the plurality of node devices, assign a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device;

add, to the quantity of node devices of the plurality of node devices, a second quantity of dummy node devices to cause a sum of the quantity of node devices of the plurality of node devices and the second quantity of dummy node devices to at least equal the quantity of partitions of the second data cube;

for each dummy node device of the second quantity of dummy node devices, assign a cost to load each partition of the second data cube from a non-volatile storage of the dummy node device that is greater than any of the costs to load any partition of the second data cube stored in the non-volatile storage of any of the node devices of the plurality of node devices;

use MILP to derive a third pass of assignment of a single copy of each partition of the second data cube to be loaded from the non-volatile storage of either a node device of the plurality of node devices or a dummy node device of the second quantity of dummy node devices;

for each copy of a partition of the second data cube assigned to be loaded from the non-volatile storage of a dummy node device of the second quantity of dummy node devices, use MILP to derive a fourth pass of assignment of the copy of the partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on a combination of the third and fourth passes of assignment.

16. The computer-program product of claim 14, wherein the processor, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, is caused to perform operations comprising:

for each copy of each partition of the second data cube stored within the non-volatile storage of a node device of the plurality of node devices, assign a cost to read the copy of the partition of the second data cube from the non-volatile storage of the node device based at least on a characteristic of any partition of the first data cube assigned in the first pass to be loaded from the non-volatile storage of the node device;

use MILP to derive a third pass of assignment of a single copy of each partition of the second data cube to be loaded from the non-volatile storage of a node device of the plurality of node devices; and augment each task routine with an indication of the assignment of a single copy of each partition of the second data cube to be loaded from the non-volatile storage of, and into the volatile storage of, a node device of the plurality of node devices based on the third pass of assignment.

17. The computer-program product of claim 11, wherein the processor is caused to perform operations comprising:

receive, from the plurality of node devices, results of the performances of the requested operation by the processors of the node devices;

generate results data indicative of a combination of the results of the performances of the requested operation; and transmit the results data to another device.

18. The computer-program product of claim 11, wherein the processor is caused to transmit instructions to the plurality of node devices to receive the plurality of partitions of the first data cube from at least one storage device for storage within the non-volatile storages of the plurality of node devices.

19. The computer-program product of claim 11, wherein:

the status of storage of each node device of the plurality of node devices is selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device; and the size of each copy of each partition of the first data cube is selected from a group consisting of the quantity of storage space currently occupied by the partition, and a quantity of entries of the partition.

20. The computer-program product of claim 11, wherein the operation is selected from a group consisting of a join of the first data cube with one or more other data cubes, a retrieval of the first data cube to transmit at least a subset of the first data cube to another device, and an analysis of at least a subset of the first data cube.

21. A computer-implemented method comprising:

receiving, at a coordinating device of a node device grid, node status from a plurality of node devices of the node device grid, wherein the node status comprises an indication of status of storage of each node device of the plurality of node devices;

receiving, at the coordinating device, a request to perform an operation with a first data cube, wherein:
the first data cube comprises a plurality of partitions; and
at least one copy of the partitions of the first data cube are distributed among the plurality of node devices such that non-volatile storage of each node device stores a copy of at least one partition of the first data cube;

comparing, at the coordinating device, quantities of the node devices of the plurality of node devices and of the partitions of the first data cube to determine whether the quantity of node devices of the plurality of node devices is less than the quantity of partitions of the first data cube;

in response to a determination that the quantity of node devices of the plurality of node devices is less than the quantity of partitions of the first data cube, performing operations at the coordinating device comprising:
for each copy of each partition of the first data cube stored within the non-volatile storage of a node device of the plurality of node devices, assigning a cost to load the copy of the partition from the non-volatile storage of the node device based at least on a size of the partition;

adding, to the quantity of node devices of the plurality of node devices, a first quantity of dummy node devices to cause a sum of the quantity of node devices of the plurality of node devices and the first quantity of dummy node devices to at least equal the quantity of partitions of the first data cube;

for each dummy node device of the first quantity of dummy node devices, assigning a cost to load each partition of the first data cube from a non-volatile storage of the dummy node device that is greater than any of the costs to load any partition of the first data cube stored in the non-volatile storage of any of the node devices of the plurality of node devices;

using mixed integer linear programming (MILP), deriving a first pass of assignment of a single copy of each partition of the first data cube to be loaded from the non-volatile storage of either a node device of the plurality of node devices or a dummy node device of the first quantity of dummy node devices; and transmitting, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on at least the first pass of assignment.

22. The computer-implemented method of claim 21, comprising, in response to a determination that the quantity of node devices of the plurality of node devices is less than the quantity of partitions of the first data cube, performing operations at the coordinating device comprising:

for each copy of a partition of the first data cube assigned to be loaded from the non-volatile storage of a dummy node device of the first quantity of dummy node devices, using MILP to derive a second pass of assignment of the copy of the partition of the first data cube to be loaded from the non-volatile storage of a node device of the plurality of node devices;

augmenting at least one task routine with an indication as the assignment of a single copy of a partition of the first data cube to be loaded from the non-volatile storage of, and into the volatile storage of, a node device of the plurality of node devices based on the second pass of assignment;

analyzing the distribution of the partitions of the first data cube among the plurality of node devices to determine whether there is at least a one-to-one distribution of at least one copy of the partitions of the first data cube among the plurality of node devices; and conditioning the transmission of the task routines to the plurality of node devices on a determination that there is not at least a one-to-one distribution of at least one copy of the partitions of the first data cube among the plurality of node devices.

23. The computer-implemented method of claim 21, comprising, in response to both a determination that the quantity of node devices of the plurality of node devices is equal to or greater than the quantity of partitions of the first data cube and a determination that there is at least a one-to-one distribution of at least one copy of the partitions of the first data cube among the plurality of node devices, performing operations at the coordinating device comprising:

for each copy of each partition of the first data cube stored within the non-volatile storage of a node device of the plurality of node devices, assigning a single identical cost to load the copy of the partition from the non-volatile storage of the node device;

deriving, as a linear assignment problem, the first pass of assignment of a single copy of each partition of the first data cube to be loaded from the non-volatile storage of a node device of the plurality of node devices; and transmitting, to the plurality of node devices, task routines for execution by processors of the plurality of node devices to perform the requested operation, wherein each task routine comprises an indication of the assignment of a single copy of each partition of the first data cube to be loaded from the non-volatile storage of, and into the volatile storage of, a node device of the plurality of node devices based on the first pass of assignment.

24. The computer-implemented method of claim 21, wherein:

the requested operation is to be performed with a second data cube in addition to the first data cube;

the second data cube comprises a plurality of partitions;

the partitions of the second data cube are distributed among the plurality of node devices such that non-volatile storage of each node device stores a copy of at least one partition of the second data cube; and the method comprises:

comparing, at the coordinating device, quantities of the node devices of the plurality of node devices and of the partitions of the second data cube to determine whether the quantity of node devices of the plurality of node devices is less than the quantity of partitions of the second data cube; and analyzing, at the coordinating device, the distribution of the partitions of the second data cube among the plurality of node devices to determine whether there is at least a one-to-one distribution of at least one copy of the partitions of the second data cube among the plurality of node devices.

25. The computer-implemented method of claim 24, comprising, in response to either a determination that the quantity of node devices of the plurality of node devices is less than the quantity of partitions of the second data cube, or a determination that there is not at least a one-to-one distribution of at least one copy of the partitions of the second data cube among the plurality of node devices, performing operations at the coordinating device comprising:

for each copy of each partition of the second data cube stored within the non-volatile storage of a node device of the plurality of node devices, assigning a cost to load the copy of the partition of the second data cube from the non-volatile storage of the node device based at least on a characteristic of the partition of the second data cube and a characteristic of any partition of the first data cube indicated as assigned in the task routines to be loaded from the non-volatile storage of the node device;

adding, to the quantity of node devices of the plurality of node devices, a second quantity of dummy node devices to cause a sum of the quantity of node devices of the plurality of node devices and the second quantity of dummy node devices to at least equal the quantity of partitions of the second data cube;

for each dummy node device of the second quantity of dummy node devices, assigning a cost to load each partition of the second data cube from a non-volatile storage of the dummy node device that is greater than any of the costs to load any partition of the second data cube stored in the non-volatile storage of any of the node devices of the plurality of node devices;

using MILP to derive a third pass of assignment of a single copy of each partition of the second data cube to be loaded from the non-volatile storage of either a node device of the plurality of node devices or a dummy node device of the second quantity of dummy node devices;

for each copy of a partition of the second data cube assigned to be loaded from the non-volatile storage of a dummy node device of the second quantity of dummy node devices, using MILP to derive a fourth pass of assignment of the copy of the partition of the second data cube to be loaded from the non-volatile storage of a node device of the plurality of node devices; and augmenting each task routine with an indication of the assignment of a single copy of each partition of the second data cube to be loaded from the non-volatile storage of, and into the volatile storage of, a node device of the plurality of node devices based on a combination of the third and fourth passes of assignment.

26. The computer-implemented method of claim 24, comprising, in response to both a determination that the quantity of node devices of the plurality of node devices is equal to or greater than the quantity of partitions of the second data cube and a determination that there is at least a one-to-one distribution of at least one copy of the partitions of the second data cube among the plurality of node devices, performing operations at the coordinating device comprising:

for each copy of each partition of the second data cube stored within the non-volatile storage of a node device of the plurality of node devices, assigning a cost to read the copy of the partition of the second data cube from the non-volatile storage of the node device based at least on a characteristic of any partition of the first data cube assigned in the first pass to be loaded from the non-volatile storage of the node device;

using MILP to derive a third pass of assignment of a single copy of each partition of the second data cube to be loaded from the non-volatile storage of a node device of the plurality of node devices; and augmenting each task routine with an indication of the assignment of a single copy of each partition of the second data cube to be loaded from the non-volatile storage of, and into the volatile storage of, a node device of the plurality of node devices based on the third pass of assignment.

27. The computer-implemented method of claim 21, comprising:

receiving, at the coordinating device and from the plurality of node devices, results of the performances of the requested operation by the processors of the node devices;

generating, at the coordinating device, results data indicative of a combination of the results of the performances of the requested operation; and transmitting, from the coordinating device, the results data to another device.

28. The computer-implemented method of claim 21, comprising transmitting instructions to the plurality of node devices to receive the plurality of partitions of the first data cube from at least one storage device for storage within the non-volatile storages of the plurality of node devices.

29. The computer-implemented method of claim 21, wherein:

the status of storage of each node device of the plurality of node devices is selected from a group consisting of a storage capacity provided by the volatile storage, a storage capacity provided by the non-volatile storage, a speed of access of the volatile storage, a speed of access of the non-volatile storage, a quantity of currently occupied storage space of the volatile storage, a quantity of currently occupied storage space of the non-volatile storage, and a storage capacity provided by a cache of the processor of the node device; and the size of each copy of each partition of the first data cube is selected from a group consisting of the quantity of storage space currently occupied by the partition, and a quantity of entries of the partition.

30. The computer-implemented method of claim 21, wherein the operation is selected from a group consisting of a join of the first data cube with one or more other data cubes, a retrieval of the first data cube to transmit at least a subset of the first data cube to another device, and an analysis of at least a subset of the first data cube.

* * * * *